United States Patent
Chen

(10) Patent No.: US 9,496,104 B1
(45) Date of Patent: Nov. 15, 2016

(54) LUMINOUS KEYBOARD

(71) Applicant: Primax Electronics Ltd., Neihu, Taipei (TW)

(72) Inventor: Chung-Yuan Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 14/831,466

(22) Filed: Aug. 20, 2015

(30) Foreign Application Priority Data

Jul. 3, 2015 (TW) .............................. 104121672 A

(51) Int. Cl.
| F21V 7/04 | (2006.01) |
| H01H 13/83 | (2006.01) |
| H01H 13/7065 | (2006.01) |
| F21V 8/00 | (2006.01) |

(52) U.S. Cl.
CPC ......... *H01H 13/83* (2013.01); *H01H 13/7065* (2013.01); *G02B 6/0011* (2013.01); *G02B 6/0021* (2013.01); *H01H 2205/002* (2013.01); *H01H 2219/036* (2013.01)

(58) Field of Classification Search
CPC .............. H01H 13/83; H01H 13/7065; H01H 2219/062; H01H 2219/036; H01H 2219/044; H01H 2219/054; H01H 2219/06; H01H 2205/002; H01H 13/023; H01H 2221/07; F21V 33/052; G02B 6/0011; G02B 6/0021; G02B 6/0043
See application file for complete search history.

(56) References Cited

U.S. PATENT DOCUMENTS

| 2008/0170381 A1* | 7/2008 | Chou et al. ........... G02B 6/0021 362/23.03 |
| 2009/0103964 A1* | 4/2009 | Takagi et al. .......... H01H 3/125 400/495 |
| 2013/0250611 A1* | 9/2013 | Lee et al. ............... G02B 6/005 362/607 |

FOREIGN PATENT DOCUMENTS

KR           EP 2719943 A1 *  4/2014  ........... G02B 6/0088

* cited by examiner

*Primary Examiner* — Y M Lee
(74) *Attorney, Agent, or Firm* — Kirton McConkie; Evan R. Witt

(57) ABSTRACT

A luminous keyboard includes a keypad module, plural light-emitting elements, an illumination circuit board and a light guide plate. The illumination circuit board has a light amount control structure. The light amount control structure is disposed on a circuit board main body or a protective layer of the illumination circuit board, and arranged between the light guide plate and the illumination circuit board. When the plural light-emitting elements emit light beams to the illumination circuit board, the light beams are projected on the light amount control structure, and the reflected fraction of the light beams is reduced. Since the light beams are not very centralized, the problem of generating bright spots will be diminished.

10 Claims, 17 Drawing Sheets

LUMINOUS KEYBOARD

FIELD OF THE INVENTION

The present invention relates to a keyboard, and more particularly to a luminous keyboard with an illuminating function.

BACKGROUND OF THE INVENTION

Generally, the widely-used peripheral input device of a computer system includes for example a mouse device, a keyboard, a trackball device, or the like. Via the keyboard, characters and symbols can be inputted into the computer system directly. As a consequence, most users and most manufacturers of input devices pay much attention to the development of keyboards.

FIG. 1 is a schematic top view illustrating the outer appearance of a conventional keyboard. As shown in FIG. 1, there are plural keys 10 on a surface of the conventional keyboard 1. These keys 10 are classified into several types, e.g. ordinary keys 101, numeric keys 102 and function keys 103. When one of these keys 10 is depressed by the user's finger, a corresponding signal is issued to the computer, and thus the computer executes a function corresponding to the depressed key. For example, when an ordinary key 101 is depressed, a corresponding English letter or symbol is inputted into the computer. When a numeric key 102 is depressed, a corresponding number is inputted into the computer. In addition, the function keys 103 (F1~F12) can be programmed to provide various functions. For example, the conventional keyboard 1 is a keyboard for a notebook computer.

With the maturity of the computing technologies, the keyboard manufacturers make efforts in designing novel keyboards with special functions in order to meet diversified requirements of different users. For this reason, luminous keyboards are favored by users. The outer appearance of the conventional luminous keyboard is substantially similar to the outer appearance of the conventional keyboard 1. Since the luminous keyboard provides the function of illuminating the keys, the inner structure of the luminous keyboard is different from the inner structure of the keyboard without the illuminating function. Hereinafter, the inner structure of the luminous keyboard will be illustrated in more details. FIG. 2 is a schematic cross-sectional view illustrating a conventional luminous keyboard. As shown in FIG. 2, the conventional luminous keyboard 2 comprises plural keys 20, a membrane switch circuit member 21, a light guide plate 22, a backlight module 23, a supporting plate 24 and a reflecting plate 25. Each key 20 comprises a keycap 201, a scissors-type connecting element 202 and an elastic element 203. From top to bottom, the keycap 201, the scissors-type connecting element 202, the elastic element 203, the membrane switch circuit member 21, the supporting plate 24, the light guide plate 22 and the reflecting plate 25 of the conventional luminous keyboard 2 are sequentially shown. The backlight module 23 is located at a side of the membrane switch circuit member 22. For example, the conventional luminous keyboard 2 is a keyboard for a notebook computer (not shown).

In the key 20, the keycap 201 is exposed outside the conventional luminous keyboard 2, so that the keycap 201 can be depressed by the user. The scissors-type connecting element 202 is used for connecting the keycap 201 and the supporting plate 24. The elastic element 203 is penetrated through the scissors-type connecting element 202. In addition, both ends of the elastic element 203 are contacted with the keycap 201 and the membrane switch circuit member 21, respectively. The membrane switch circuit member 21 comprises an upper wiring board 211, a spacer layer 212, and a lower wiring board 213. The upper wiring board 211, the spacer layer 212 and the lower wiring board 213 are all made of a light-transmissible material. The light-transmissible material is for example polycarbonate (PC) or polyethylene (PE). The upper wiring board 211 has plural upper contacts 2111. The spacer layer 212 is disposed under the upper wiring board 211, and comprises plural perforations 2121 corresponding to the plural upper contacts 2111. The lower wiring board 213 is disposed under the spacer layer 212, and comprises plural lower contacts 2131 corresponding to the plural upper contacts 2111. The plural lower contacts 2131 and the plural upper contacts 2111 are collectively defined as plural key switches 214.

The backlight module 23 comprises an illumination circuit board 231 and plural light-emitting elements 232. For clarification and brevity, only two light-emitting elements 232 are shown in the drawing. The illumination circuit board 231 is disposed under the membrane switch circuit member 21 for providing electric power to the plural light-emitting elements 232. The plural light-emitting elements 232 are disposed on the illumination circuit board 231. In addition, the plural light-emitting elements 232 are inserted into plural reflecting plate openings 251 of the reflecting plate 25 and plural light guide plate openings 221 of the light guide plate 22, respectively. By acquiring the electric power, the plural light-emitting elements 232 are driven to emit plural light beams B. Moreover, the plural light beams B are introduced into the light guide plate 22. For example, the plural light-emitting elements 232 are side-view light emitting diodes. The plural light beams B are subjected to total internal reflection within the light guide plate 22, and thus the plural light beams B are guided to the keycaps 201 by the light guide plate 22. As shown in FIG. 2, the supporting plate 24 is arranged between the membrane switch circuit member 21 and the light guide plate 22 for supporting the keycap 201, the scissors-type connecting element 202, the elastic element 203 and the membrane switch circuit member 21. The reflecting plate 25 is disposed under the light guide plate 22 for reflecting the plural light beams B. Consequently, the plural light beams B are directed upwardly, and the utilization efficiency of the light beams B is enhanced.

In the conventional luminous keyboard 2, each keycap 201 has a light-outputting zone 2011. The light-outputting zone 2011 is located at a character region or a symbol region of the keycap 201. Moreover, the position of the light-outputting zone 2011 is aligned with the position of a corresponding light-guiding dot 223 of the light guide plate 22. The light beams B can be guided upwardly to the light-outputting zone 2011 by the corresponding light-guiding dot 223. The supporting plate 24 comprises plural supporting plate openings. The plural supporting plate openings are aligned with corresponding light-guiding dots 223 and corresponding light-outputting zones 2011. On the other hand, since the membrane switch circuit member 21 is made of the light-transmissible material, the plural light beams B can be transmitted through the membrane switch circuit member 21. Consequently, after the plural light beams B are guided by the light-guiding dots 223, the plural light beams B are sequentially transmitted through the plural supporting plate openings and the membrane switch circuit member 21 and directed to the plural light-outputting zones 2011, thereby illuminating the character region or the symbol region of the keycap 201. Under this circumstance, the illuminating function is achieved.

While the plural light beams B are projected to the light guide plate 22, the plural light beams B are radiated from the light-emitting elements 232. Consequently, portions of the plural light beams B are introduced into the light guide plate 22 at a larger incident angle and unable to be subjected to total internal reflection within the light guide plate 22. The portions of the plural light beams B unable to be subjected to total internal reflection are transferred through the light guide plate 22 and projected upwardly. Under this circumstance, bright spots are usually generated at the locations near the light-emitting elements 232. The bright spots are also referred as bright bands or bright areas. The occurrence of the bright spots indicates that the light beams are very centralized and the illuminating efficacy is highly centralized. In other words, the luminous uniformity of the conventional luminous keyboard 2 is unsatisfied.

Therefore, there is a need of providing a luminous keyboard with enhanced luminous uniformity.

SUMMARY OF THE INVENTION

An object of the present invention provides a luminous keyboard with enhanced luminous uniformity.

In accordance with an aspect of the present invention, there is provided a luminous keyboard. The luminous keyboard includes a keypad module, at least one light-emitting element, an illumination circuit board and a light guide plate. The keypad module is exposed to a top surface of the luminous keyboard. The at least one light-emitting element is disposed under the keypad module, and emits at least one light beam. The illumination circuit board is disposed under the keypad module, and supports the at least one light-emitting element. The illumination circuit board includes a circuit board main body and a protective layer. The circuit board main body is electrically connected with the at least one light-emitting element. The at least one light-emitting element is supported on the circuit board main body. The protective layer is disposed on a top surface of the circuit board main body to protect the circuit board main body. The light guide plate is disposed under the keypad module. The at least one light beam is subjected to total internal reflection within the light guide plate and guided to the keypad module by the light guide plate. The protective layer has a light amount control structure. The light amount control structure is disposed on a top surface of the protective layer. When the at least one light beam is projected on the illumination circuit board, a reflected fraction of the at least one light beam is reduced by the light amount control structure.

In accordance with another aspect of the present invention, there is provided a luminous keyboard. The luminous keyboard includes a keypad module, at least one light-emitting element, an illumination circuit board and a light guide plate. The keypad module is exposed to a top surface of the luminous keyboard. The at least one light-emitting element is disposed under the keypad module, and emits at least one light beam. The illumination circuit board is disposed under the keypad module, and supports the at least one light-emitting element. The illumination circuit board includes a circuit board main body. The circuit board main body is electrically connected with the at least one light-emitting element. The at least one light-emitting element is supported on the circuit board main body. The light guide plate is disposed under the keypad module. The at least one light beam is subjected to total internal reflection within the light guide plate and guided to the keypad module by the light guide plate. The circuit board main body has a light amount control structure. The light amount control structure is disposed on a top surface of the circuit board main body. When the at least one light beam is projected on the illumination circuit board, a reflected fraction of the at least one light beam is reduced by the light amount control structure.

From the above descriptions, the present invention provides a luminous keyboard. The luminous keyboard has an illumination circuit board with a specified structure. That is, a light amount control structure with many variant examples is disposed on the illumination circuit board, and the light amount control structure is arranged between a light guide plate and plural light-emitting elements. That is, the light amount control structure is located at the propagating path of the light beams. By means of the light amount control structure, the reflected fraction of the light beams is reduced. Since the light beams are not very centralized, the problem of generating bright spots will be diminished.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional luminous keyboard, the present invention provides an improved luminous keyboard.

Figure 1:
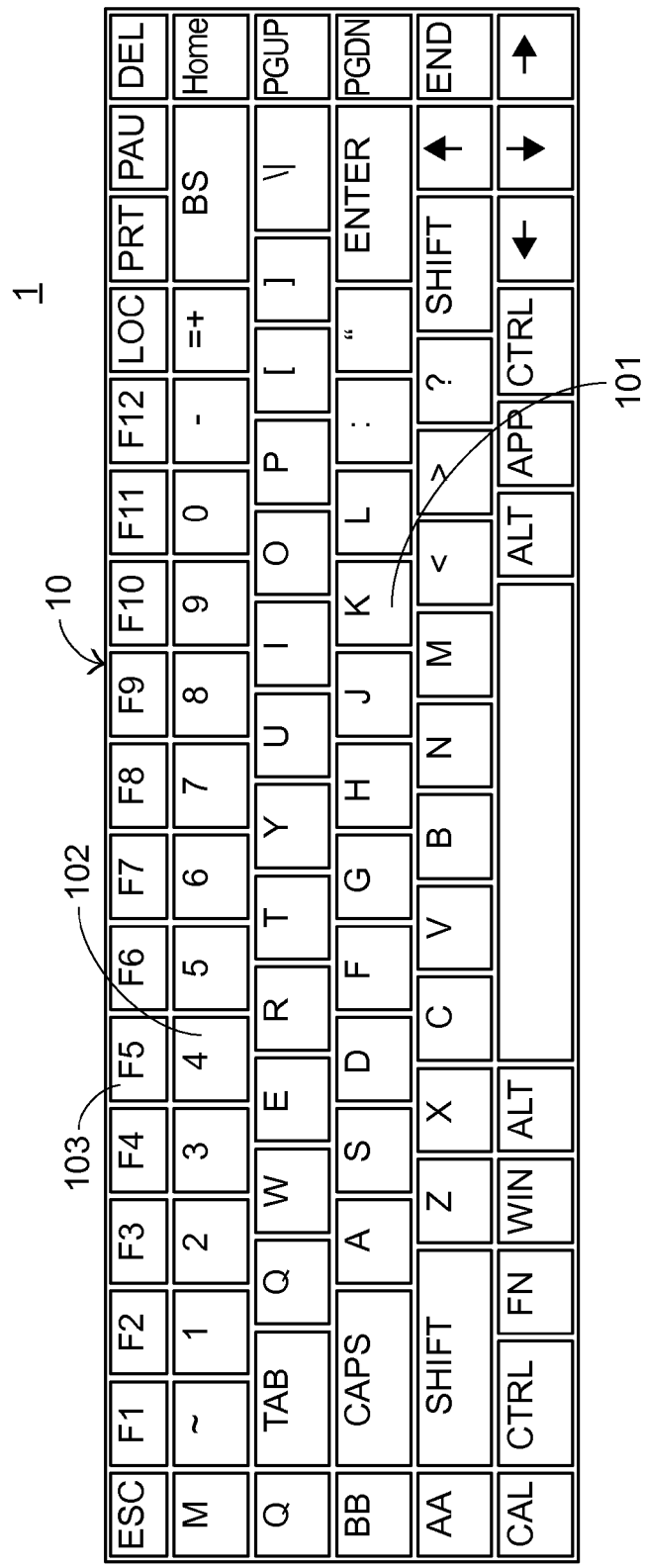
FIG. 1 is a schematic top view illustrating the outer appearance of a conventional keyboard.
Figure 2:
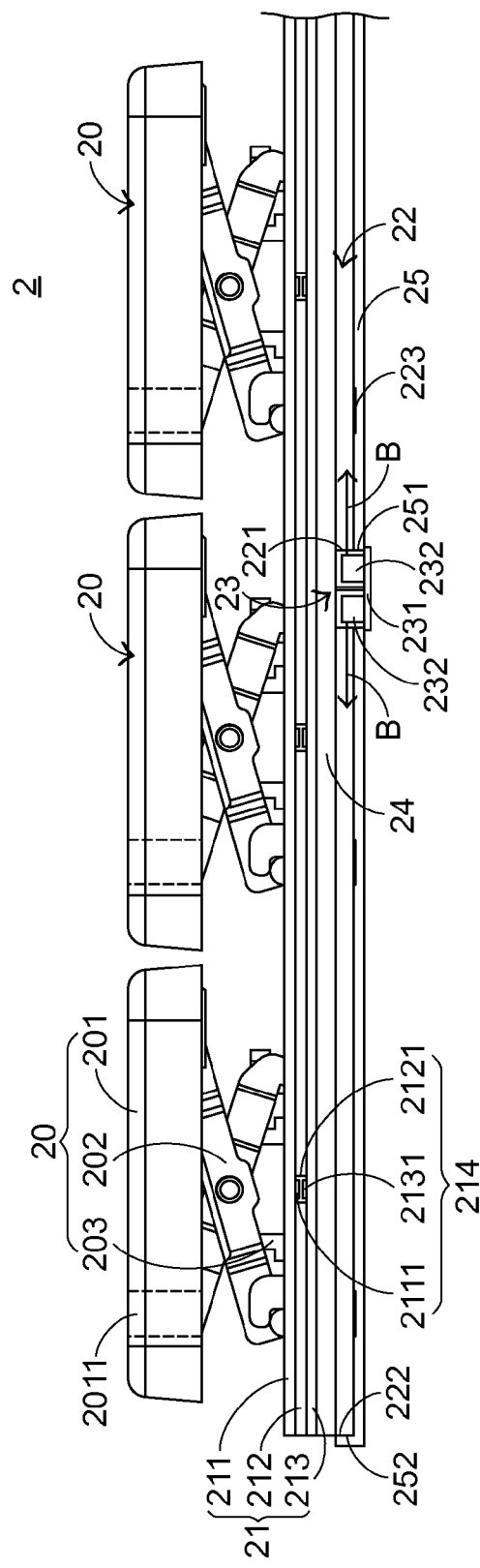
FIG. 2 is a schematic cross-sectional view illustrating a conventional luminous keyboard.
Figure 3:
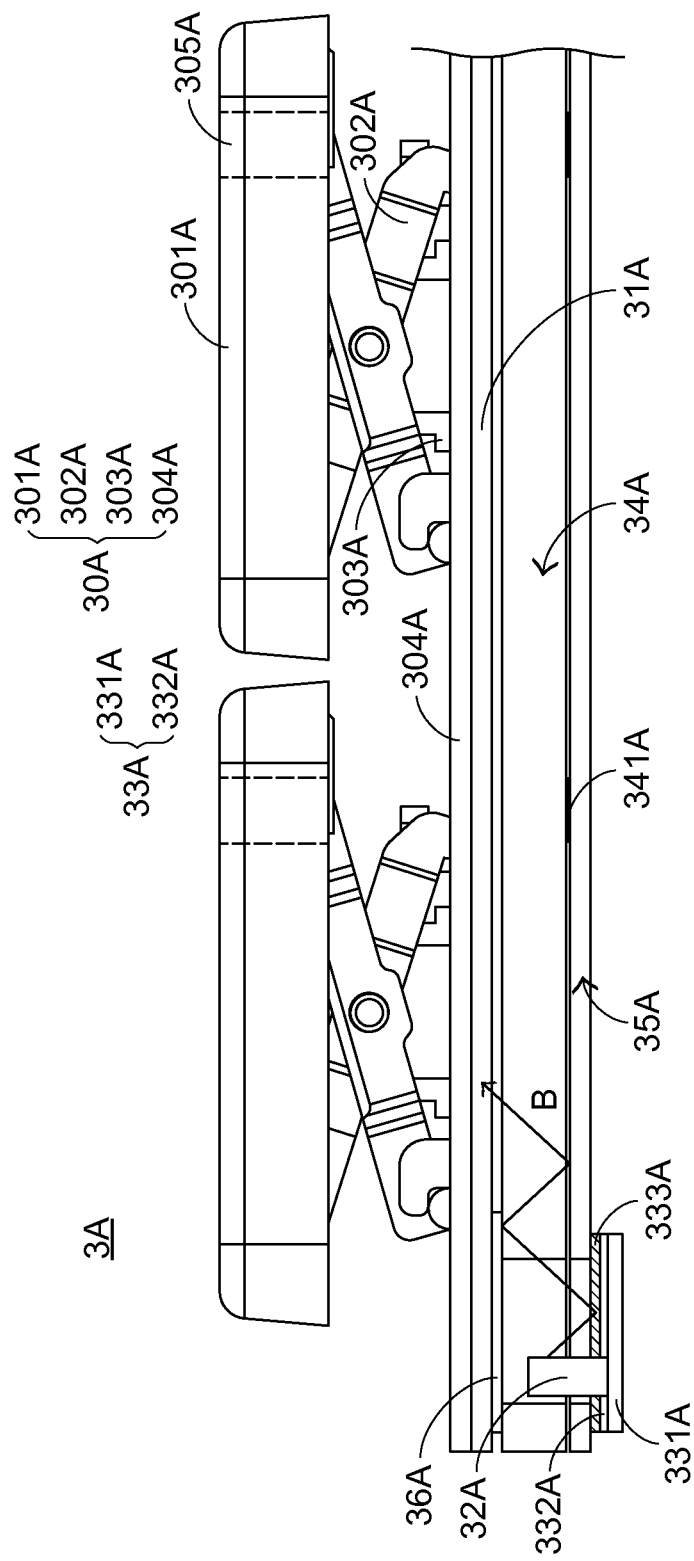
FIG. 3 is a schematic cross-sectional view illustrating the structure of a luminous keyboard according to a first embodiment of the present invention.

First of all, the structure of the luminous keyboard of the present invention will be illustrated as follows. FIG. 3 is a schematic cross-sectional view illustrating the structure of a luminous keyboard according to a first embodiment of the present invention. As shown in FIG. 3, the luminous keyboard 3A comprises a keypad module 30A, a supporting plate 31A, plural light-emitting elements 32A, an illumination circuit board 33A, a light guide plate 34A, a reflecting plate 35A and a light-shading plate 36A. For clarification and brevity, only one light-emitting element 32A is shown in the drawing. The keypad module 30A is exposed to a top surface of the luminous keyboard 3A. The keypad module 30A comprises plural keycaps 301A, plural connecting elements 302A, plural elastic elements 303A and a switch circuit member 304A. Each of the plural keycaps 301A, the corresponding connecting element 302A and the corresponding elastic element 303A are collaboratively defined as a key. Each keycap 301A has a light-outputting zone 305A. The plural keycaps 301A are exposed to the top surface of the luminous keyboard 3A, so that the keycaps 301A can be depressed by the user. The connecting elements 302A are used for connecting the corresponding keycaps 301A and the supporting plate 31A and allowing the keycaps 301A to be moved upwardly or downwardly relative to the supporting plate 31A. The elastic elements 303A are penetrated through the corresponding connecting elements 302A, and contacted with the corresponding keycaps 301A and the switch circuit member 304A. The switch circuit member 304A is disposed under the plural keys. When the switch circuit member 304A is triggered by the plural elastic elements 303A, plural key signals are correspondingly generated. The structure of the switch circuit member 304A is similar to that of the conventional membrane switch circuit member, and is not redundantly described herein. It is noted that the switch circuit member 304A is not limited to the membrane switch circuit member.

In this embodiment, the connecting element 302A is a scissors-type connecting element, and the elastic element 303A is a rubbery elastomer. Preferably but are not exclusively, the plural keycaps 301A of the plural keys are moved upwardly or downwardly with the connecting elements 302A, and the switch circuit member 304A is depressed by the plural elastic elements 303A through the plural keys. In another embodiment, the connecting elements are non-scissors connecting element for controlling movements of the keys. In a further embodiment, the keycaps are moved upwardly or downwardly in response to magnetic forces.

Please refer to FIG. 3 again. The plural light-emitting elements 32A are disposed on the illumination circuit board 33A, and disposed under the keypad module 30A. Moreover, the plural light-emitting elements 32A are partially inserted into the light guide plate 34A. The plural light-emitting elements 32A are used for emitting plural light beams B, and the plural light beams B are laterally introduced into the light guide plate 34A. The illumination circuit board 33A is disposed under the keypad module 30A, and the plural light-emitting elements 32A are supported on the illumination circuit board 33A. The illumination circuit board 33A comprises a circuit board main body 331A and a protective layer 332A. The circuit board main body 331A is electrically connected with the at least one light-emitting element 32A, and the plural light-emitting elements 32A are supported on the circuit board main body 331A. The protective layer 332A is disposed on a top surface of the circuit board main body 331A for protecting electrical contacts (not shown) of the circuit board main body 331A. Moreover, the protective layer 332A has a light amount control structure 333A. The light amount control structure 333A is disposed on a top surface of the protective layer 332A, and arranged between the circuit board main body 331A and the light guide plate 34A. Moreover, the light amount control structure 333A is exposed to the region between the plural light-emitting elements 32A and the light guide plate 34A. The arrangement of the light amount control structure 333A can reduce the reflected fraction of the light beams B. In this embodiment, the plural light-emitting elements 32A are side-view light emitting diodes, and the illumination circuit board 33A is a flexible printed circuit (FPC). The circuit board main body 331A is formed by combining polyimide (PI) and copper foil together. The protective layer 332A is made of a transparent material.

In this embodiment, the light amount control structure 333A is made of a light absorption material, and the light amount control structure 333A is attached on the top surface of the protective layer 332A. The light amount control structure 333A is used for absorbing portions of the plural light beams B so as to reduce the reflected fraction of the light beams B. Since the light beams are not very centralized, the problem of generating bright spots will be diminished. In an embodiment, the light absorption material is a composite material of a high refractive index material and a low refractive index material, wherein the low refractive index material is covered by the high refractive index material. Alternatively, the light absorption material is selected from a surface plasmon material or a metamaterial. The examples of the light absorption material are presented herein for purpose of illustration and description only. In another embodiment, the light absorption material is formed on the top surface of the protective layer by a depositing process, a printing process or a transfer printing process, so that the light amount control structure is produced.

The light guide plate 34A is disposed under the keypad module 30A. The plural light beams B are subjected to total internal reflection within the light guide plate 34A, and thus the plural light beams B are guided to the keypad module 30A by the light guide plate 34A. The light guide plate 34A comprises plural light-guiding structures 341A. Each light-guiding structure 341A is aligned with the corresponding light-outputting zone 305A. The plural light beams B can be guided to the corresponding light-outputting zones 305A by the light-guiding structures 341A so as to illuminate the corresponding keys. The reflecting plate 35A is disposed under the light guide plate 34A. The portions of the plural light beams B that are not subjected to total internal reflection within the light guide plate 34A will be reflected by the reflecting plate 35A. Consequently, the utilization efficiency of the portions of the plural light beams B that are not subjected to total internal reflection within the light guide plate 34A will be enhanced.

The light-shading plate 36A is disposed over the light guide plate 34A and the plural light-emitting elements 32A. By means of the light-shading plate 36A, the portions of the plural light beams B that are not subjected to total internal reflection within the light guide plate 34A will not be directly projected to the keypad module 30A. In an embodiment, the light-guiding structure 341A is a one of a light-guiding microstructure, a light-guiding dot, a light-guiding ink and a light-guiding texturing structure.

The operating principles of depressing the keycaps 301A of the luminous keyboard 3A to generate the key signals are well known to those skilled in the art, and are not redundantly described herein. The illumination of the luminous keyboard 3A will be illustrated as follows. Please refer to FIG. 3 again. When the plural light-emitting elements 32A emit the plural light beams B, portions of the light beams B are laterally introduced into the light guide plate 34A and subjected to total internal reflection within the light guide plate 34A. The light beams B can be guided to the corresponding light-outputting zones 305A by the light-guiding structures 341A so as to illuminate the light-outputting zones 305A. On the other hand, other portions of the plural light beams B are introduced into the light guide plate 34A at a larger incident angle and unable to be subjected to total internal reflection within the light guide plate 34A, and thus shaded by the light-shading plate 36A and reflected to the light guide plate 34A. Moreover, before the portions of the plural light beams B from the light-emitting elements 32A and at the larger incident angle strike the light-shading plate 36A, the light beams B are projected on the illumination circuit board 33A and transferred through the light amount control structure 333A.

When the light beams B are transferred through the light amount control structure 333A, portions of the light beams B are absorbed by the light amount control structure 333A. The remaining small portions of the light beams B are transmitted through the light amount control structure 333A and reflected to the light guide plate 34A by the underlying circuit board main body 331A, and then reflected by the reflecting plate 35A and no longer shaded by the light-shading plate 36A. Consequently, the remaining small portions of the light beams B are projected to the keycaps 301A and not directly projected to the light-outputting zones 305A. Since portions of the light beams B at the larger incident angle are absorbed by the light amount control structure 333A between the plural light-emitting elements 32A and the light guide plate 34A, only the remaining small portions of the light beams B are reflected to the keycaps 301A. Since the light beams are not very centralized, the problem of generating bright spots will be diminished. Under this circumstance, the luminous uniformity is enhanced.

Figure 4:
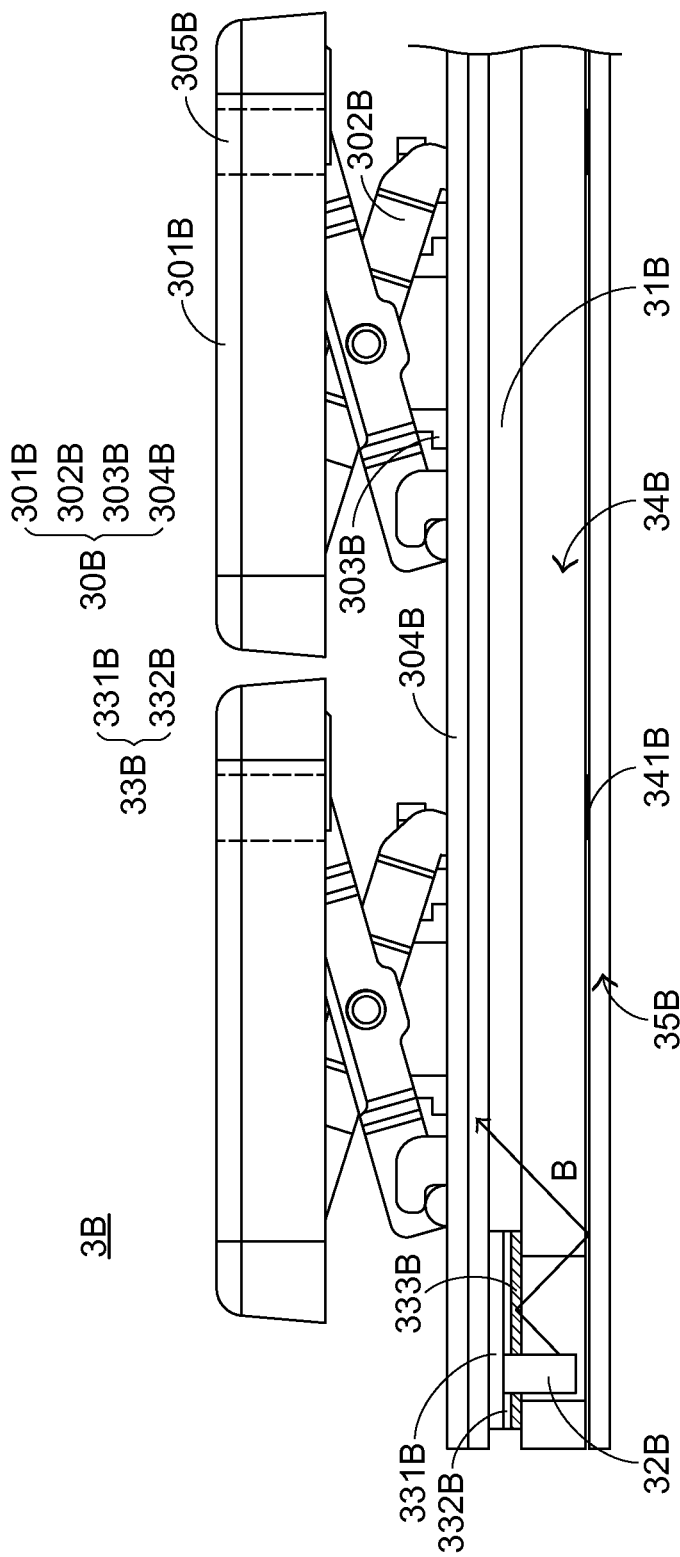
FIG. 4 is a schematic cross-sectional view illustrating the structure of a luminous keyboard according to a second embodiment of the present invention.

The present invention further provides a luminous keyboard of a second embodiment, which is distinguished from the above embodiment. FIG. 4 is a schematic cross-sectional view illustrating the structure of a luminous keyboard according to a second embodiment of the present invention. As shown in FIG. 4, the luminous keyboard 3B comprises a keypad module 30B, a supporting plate 31B, plural light-emitting elements 32B, an illumination circuit board 33B, a light guide plate 34B and a reflecting plate 35B. For clarification and brevity, only one light-emitting element 32B is shown in the drawing. The keypad module 30B comprises plural keycaps 301B, plural connecting elements 302B, plural elastic elements 303B and a switch circuit member 304B. Each keycap 301B has a light-outputting zone 305B. The light guide plate 34B comprises plural light-guiding structures 341B. Each light-guiding structure 341B is aligned with the corresponding light-outputting zone 305B. The illumination circuit board 33B comprises a circuit board main body 331B and a protective layer 332B. The protective layer 332B has a light amount control structure 333B. The components of the luminous keyboard 3B of this embodiment which are similar to the luminous keyboard 3A of the first embodiment are not redundantly described herein. In comparison with the first embodiment, the luminous keyboard 3B of this embodiment is not equipped with the light-shading plate and the arrangements of the light-emitting elements 32B and the illumination circuit board 33B are distinguished.

In the embodiment of FIG. 4, the light-emitting elements 32B are inverted, and inserted into the light guide plate 34B through an upper portion of the light guide plate 34B. In addition, the illumination circuit board 33B supporting the light-emitting elements 32B is also inverted and arranged between the supporting plate 31B and the light guide plate 34B. Since the illumination circuit board 33B is disposed over the light guide plate 34B, the illumination circuit board 33B also has the function of shading the light beams B. Consequently, the luminous keyboard 3B of this embodiment is not equipped with the light-shading plate. That is, the overall thickness of the luminous keyboard 3B is reduced, and the fabricating cost of the luminous keyboard 3B is reduced to meet the economic benefit. The illumination of the luminous keyboard 3B is similar to the illumination of the luminous keyboard 3A of the first embodiment, and is not redundantly described herein.

Figure 5:
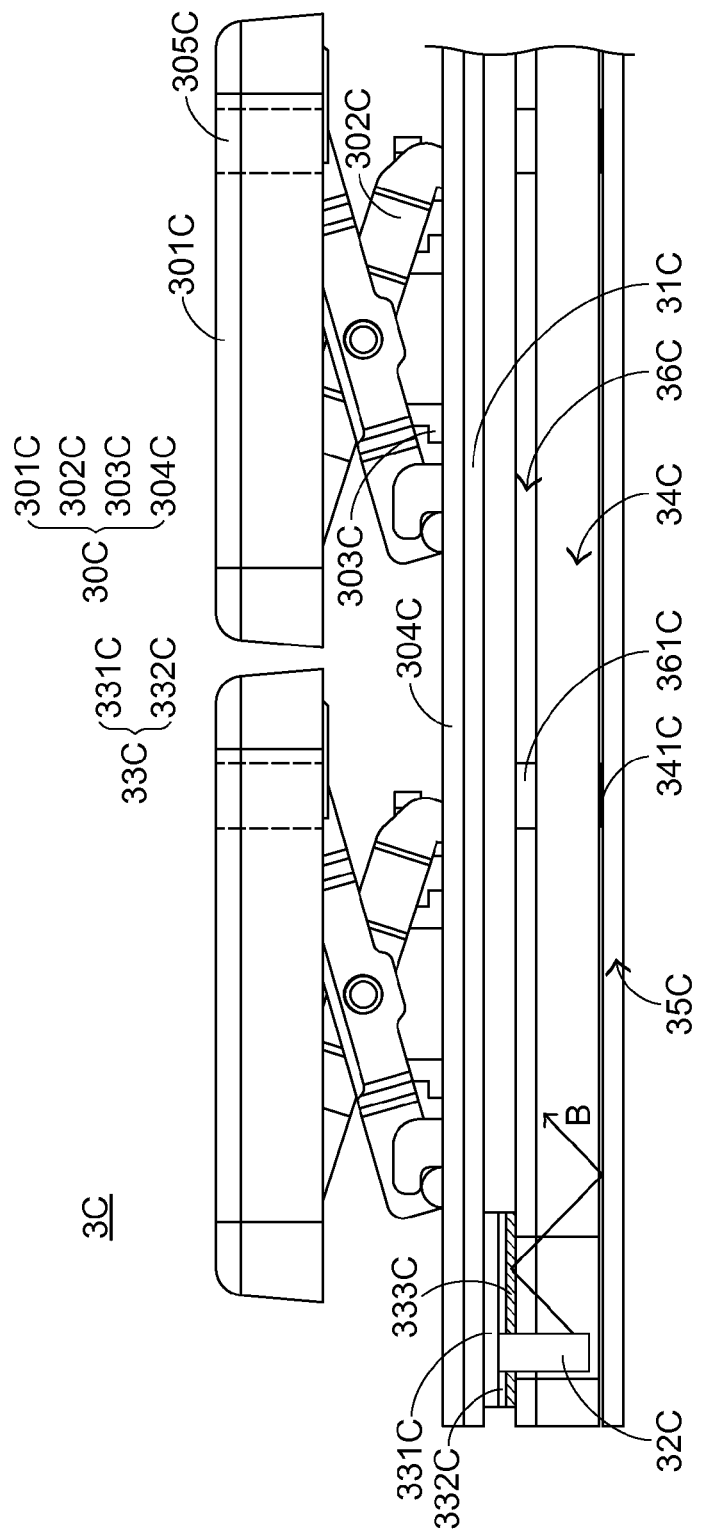
FIG. 5 is a schematic cross-sectional view illustrating the structure of a luminous keyboard according to a third embodiment of the present invention.

The present invention further provides a luminous keyboard of a third embodiment, which is distinguished from the above embodiments. FIG. 5 is a schematic cross-sectional view illustrating the structure of a luminous keyboard according to a third embodiment of the present invention. As shown in FIG. 5, the luminous keyboard 3C comprises a keypad module 30C, a supporting plate 31C, plural light-emitting elements 32C, an illumination circuit board 33C, a light guide plate 34C, a first reflecting plate 35C and a second reflecting plate 36C. For clarification and brevity, only one light-emitting element 32C is shown in the drawing. The keypad module 30C comprises plural keycaps 301C, plural connecting elements 302C, plural elastic elements 303C and a switch circuit member 304C. Each keycap 301C has a light-outputting zone 305C. The light guide plate 34C comprises plural light-guiding structures 341C. Each light-guiding structure 341C is aligned with the corresponding light-outputting zone 305C. The illumination circuit board 33C comprises a circuit board main body 331C and a protective layer 332C. The protective layer 332C has a light amount control structure 333C. The components of the luminous keyboard 3C of this embodiment which are similar to the luminous keyboard 3A of the first embodiment are not redundantly described herein. In comparison with the first embodiment, the luminous keyboard 3C of this embodiment is not equipped with the light-shading plate, and the luminous keyboard 3C further comprises the second reflecting plate 36C in replace of the light-shading plate. In addition, the illumination circuit board 33C and the light-emitting elements 32B are inverted.

The second reflecting plate 36C is disposed over the light guide plate 34C. That is, the second reflecting plate 36C and the first reflecting plate 35C are respectively disposed over and under the light guide plate 34C. The portions of the plural light beams B that are not subjected to total internal reflection within the light guide plate 34C are reflected by the first reflecting plate 35C and the second reflecting plate 36C. The second reflecting plate 36C further comprises plural openings 361C. Each opening 361C is aligned with the corresponding light-outputting zone 305C. Since the second reflecting plate 36C has the functions of shading and reflecting the light beams B, the luminous keyboard 3C of this embodiment is not equipped with the light-shading plate.

The illumination of the luminous keyboard 3C will be illustrated as follows. Please refer to FIG. 5 again. When the plural light-emitting elements 32C emit the plural light beams B, portions of the light beams B are laterally introduced into the light guide plate 34C and subjected to total internal reflection within the light guide plate 34C. The light beams B can be guided to the corresponding light-outputting zones 305C by the light-guiding structures 341C so as to illuminate the light-outputting zones 305C. On the other hand, other portions of the plural light beams B are also introduced into the light guide plate 34C at a larger incident angle and unable to be subjected to total internal reflection within the light guide plate 34C, and thus reflected to the light guide plate 34C by the second reflecting plate 36C. Moreover, before the portions of the plural light beams B from the light-emitting elements 32C and at the larger incident angle strike the first reflecting plate 35C, the light beams B are projected on the illumination circuit board 33C and transferred through the light amount control structure 333C.

When the light beams B are transferred through the light amount control structure 333C, portions of the light beams B are absorbed by the light amount control structure 333C. The remaining small portions of the light beams B are transmitted through the light amount control structure 333C and reflected to the light guide plate 34C by the underlying circuit board main body 331C. Then, the remaining small portions of the light beams B are reflected by the first reflecting plate 35C and the second reflecting plate 36C. In particular, the remaining small portions of the light beams B are alternately reflected by the first reflecting plate 35C and the second reflecting plate 36C for many times and projected to the keycaps 301C through the openings 361C.

Since portions of the light beams B are alternately reflected by the first reflecting plate 35C and the second reflecting plate 36C and absorbed by the light amount control structure 333A during the reflecting process, only the remaining small portions of the light beams B are projected to the keycaps 301C through the openings 361C. Since the light beams B are alternately reflected by the overlying second reflecting plate 36C and the underlying first reflecting plate 35C of the light guide plate 34D and the light amount control structure 333C is located at the reflection path of the light beams B, the reflected fraction of the light beams B is reduced. Since the light beams are not very centralized, the problem of generating bright spots will be diminished.

Figure 6:
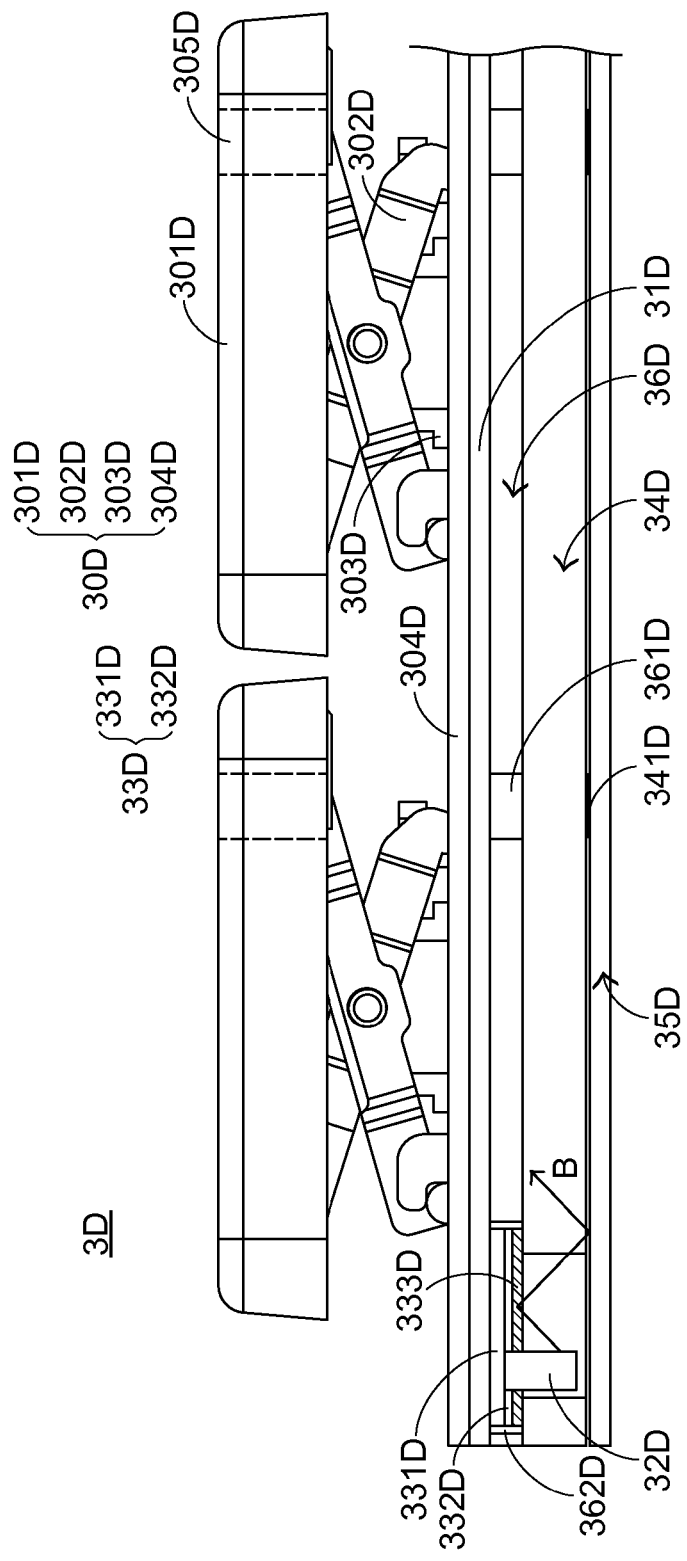
FIG. 6 is a schematic cross-sectional view illustrating the structure of a luminous keyboard according to a fourth embodiment of the present invention.

The present invention further provides a luminous keyboard of a fourth embodiment, which is distinguished from the above embodiments. FIG. 6 is a schematic cross-sectional view illustrating the structure of a luminous keyboard according to a fourth embodiment of the present invention. As shown in FIG. 6, the luminous keyboard 3D comprises a keypad module 30D, a supporting plate 31D, plural light-emitting elements 32D, an illumination circuit board 33D, a light guide plate 34D, a first reflecting plate 35D and a second reflecting plate 36D. For clarification and brevity, only one light-emitting element 32D is shown in the drawing. The keypad module 30D comprises plural keycaps 301D, plural connecting elements 302D, plural elastic elements 303D and a switch circuit member 304D. Each keycap 301D has a light-outputting zone 305D. The light guide plate 34D comprises plural light-guiding structures 341D. Each light-guiding structure 341D is aligned with the corresponding light-outputting zone 305D. The second reflecting plate 36D further comprises plural first openings 361D. Each first opening 361D is aligned with the corresponding light-outputting zone 305D. The illumination circuit board 33D comprises a circuit board main body 331D and a protective layer 332D. The protective layer 332D has a light amount control structure 333D. The components of the luminous keyboard 3D of this embodiment which are similar to the luminous keyboard 3C of the third embodiment are not redundantly described herein. In comparison with the third embodiment, the second reflecting plate 36D of the luminous keyboard 3D of this embodiment further comprises a second opening 362D. Similarly, the light beams B are allowed to pass through the plural first openings 361D of the second reflecting plate 36D. The second opening 362D is aligned with the illumination circuit board 33D and used for accommodating the illumination circuit board 33D. Consequently, the inverted light-emitting elements 32D are inserted into the light guide plate 34D through an upper portion of the light guide plate 34D.

Although the structures of the luminous keyboard 3D of this embodiment are somewhat different from the structures of the luminous keyboard 3C of the third embodiment, the position of the light amount control structure 333D is similar to that of the third embodiment. Consequently, the luminous uniformity of the luminous keyboard 3D is also enhanced. The illumination of the luminous keyboard 3D is similar to the illumination of the luminous keyboard 3C of the third embodiment, and is not redundantly described herein.

Figure 7:
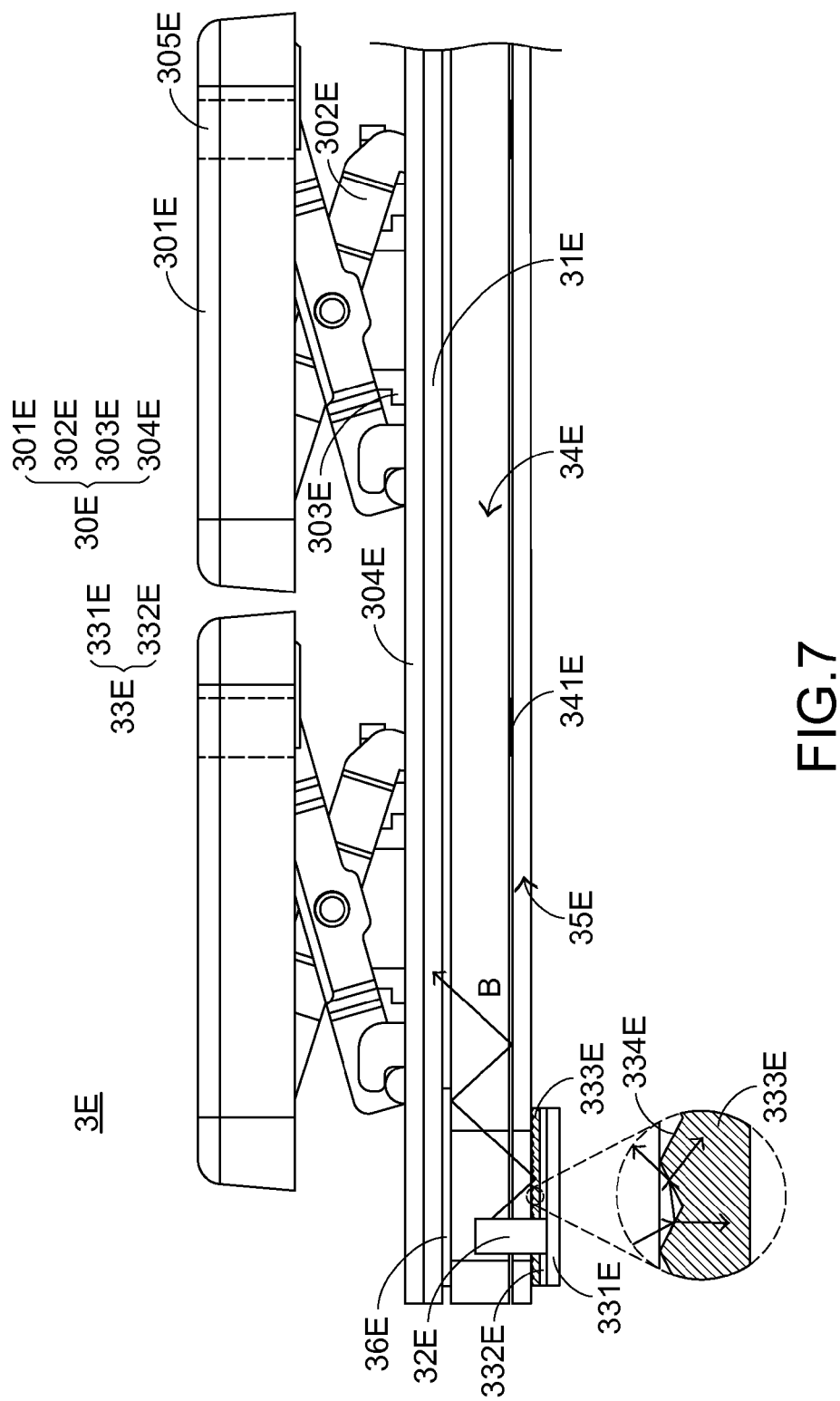
FIG. 7 is a schematic cross-sectional view illustrating the structure of a luminous keyboard according to a fifth embodiment of the present invention.

The present invention further provides a luminous keyboard of a fifth embodiment, which is distinguished from the above embodiments. FIG. 7 is a schematic cross-sectional view illustrating the structure of a luminous keyboard according to a fifth embodiment of the present invention. As shown in FIG. 7, the luminous keyboard 3E comprises a keypad module 30E, a supporting plate 31E, plural light-emitting elements 32E, an illumination circuit board 33E, a light guide plate 34E, a reflecting plate 35E and a light-shading plate 36E. For clarification and brevity, only one light-emitting element 32E is shown in the drawing. The keypad module 30E comprises plural keycaps 301E, plural connecting elements 302E, plural elastic elements 303E and a switch circuit member 304E. Each keycap 301E has a light-outputting zone 305E. The light guide plate 34E comprises plural light-guiding structures 341E. Each light-guiding structure 341E is aligned with the corresponding light-outputting zone 305E. The illumination circuit board 33E comprises a circuit board main body 331E and a protective layer 332E. The protective layer 332E has a first light amount control structure 333E. The components of the luminous keyboard 3E of this embodiment which are similar to the luminous keyboard 3A of the first embodiment are not redundantly described herein. In comparison with the first embodiment, the protective layer 332E of the luminous keyboard 3E of this embodiment further comprises a second light amount control structure 334E.

As shown in FIG. 7, the second light amount control structure 334E is disposed on a top surface of the first light amount control structure 333E. Since the plural light beams B are reflected for many times by the second light amount control structure 334E, the reflected fraction of the plural light beams B is reduced. In this embodiment, the second light amount control structure 334E is a texturing structure that is integrally formed with the first light amount control structure 333E. That is, because of the second light amount control structure 334E, the top surface of the first light amount control structure 333E is an uneven surface. Consequently, the plural light beams B are reflected for many times by the uneven surface. When the light beams B are projected on the uneven surface at a first time, portions of the light beams B are reflected by the second light amount control structure 334E (i.e., the texturing structure) and thus projected on the uneven surface at a second time. The remaining portions of the light beams that are not reflected are absorbed by the first light amount control structure 333E. The operations of the reflected light beams projected on the uneven surface at the second time are similar to the operations of the light beams projected on the uneven surface at the first time. Consequently, less amount of the light beams B is reflected by the light amount control structure 334E. In other words, after the light beams B are projected on the second light amount control structure 334E for many times, the number of times that the light beams B are reflected is increased and the reflected fraction of the light beams B is reduced. Since the light beams are not very centralized, the problem of generating bright spots will be diminished. Under this circumstance, the luminous uniformity is enhanced.

The structure of the luminous keyboard 3E of this embodiment may be modified. For example, in a variant example, the plural light-emitting elements and the illumination circuit board of the luminous keyboard are inverted. In another variant example, the plural light-emitting elements and the illumination circuit board of the luminous keyboard are inverted, and the luminous keyboard further comprises a second reflecting plate over the light guide plate. Under this circumstance, there are two ways of arranging the illumination circuit board. In a first arranging way, the illumination circuit board is disposed over the second reflecting plate, and the plural light-emitting elements are inserted into an upper portion of the light guide plate (i.e., similar to the arrangement of FIG. 5). In a second arranging way, the plural light-emitting elements and the illumination circuit board are inverted and accommodated within the second opening of the second reflecting plate, and the plural light-emitting elements are inserted into an upper portion of the light guide plate (i.e., similar to the arrangement of FIG. 6). By changing the locations of some components, different stack structures of the luminous keyboard can be produced. These stack structures can diminish the problem of generating bright spots.

Figure 8:
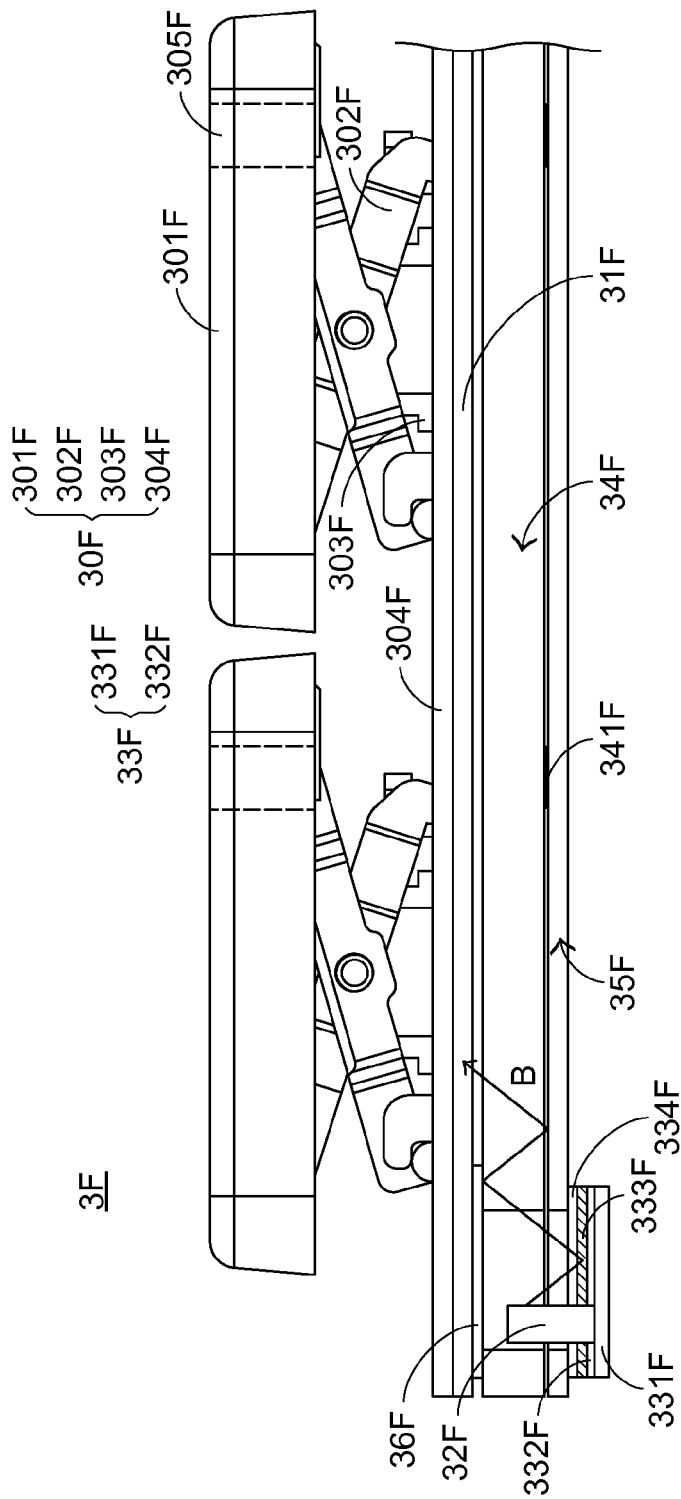
FIG. 8 is a schematic cross-sectional view illustrating the structure of a luminous keyboard according to a sixth embodiment of the present invention.

The present invention further provides a luminous keyboard of a sixth embodiment, which is distinguished from the above embodiments. FIG. 8 is a schematic cross-sectional view illustrating the structure of a luminous keyboard according to a sixth embodiment of the present invention. As shown in FIG. 8, the luminous keyboard 3F comprises a keypad module 30F, a supporting plate 31F, plural light-emitting elements 32F, an illumination circuit board 33F, a light guide plate 34F, a reflecting plate 35F and a light-shading plate 36F. For clarification and brevity, only one light-emitting element 32F is shown in the drawing. The keypad module 30F comprises plural keycaps 301F, plural connecting elements 302F, plural elastic elements 303F and a switch circuit member 304F. Each keycap 301F has a light-outputting zone 305F. The light guide plate 34F comprises plural light-guiding structures 341F. Each light-guiding structure 341F is aligned with the corresponding light-outputting zone 305F. The illumination circuit board 33F comprises a circuit board main body 331F and a protective layer 332F. The protective layer 332F has a first light amount control structure 333F. The components of the luminous keyboard 3F of this embodiment which are similar to the luminous keyboard 3A of the first embodiment are not redundantly described herein. In comparison with the first embodiment, the following two aspects of the luminous keyboard 3F of this embodiment are distinguished. Firstly, the first light amount control structure 333F is made of an anti-reflection material. Secondly, the protective layer 332F of the luminous keyboard 3F of this embodiment further comprises a second light amount control structure 334F.

The operating principles of the anti-reflection material will be described as follows. When the light beams is transferred from a first transparent object to a second transparent object with a different refractive index, the light beams are reflected by the interface between the first object and the second object. In case that the difference between the refractive indexes of these two objects is higher, the intensity of the reflective light beams is stronger. For achieving the anti-reflecting function, the material with the refractive index close to air is selected as the anti-reflection material. In an embodiment, the anti-reflection material is magnesium fluoride (MgF2), silicon dioxide (SiO2), Teflon, or any other appropriate material.

As shown in FIG. 8, the first light amount control structure 333F is deposited on a top surface of the protective layer 332F, and the second light amount control structure 334F is disposed on a top surface of the first light amount control structure 333F. The second light amount control structure 334F is not used for absorbing the light beams B. By the second light amount control structure 334F, the amount of the light beams B to be projected on the first light amount control structure 333F is reduced, and thus the reflected fraction of the light beams B is reduced. In this embodiment, the second light amount control structure 334F is made of an anti-reflection material. Consequently, when the light beams B are transferred through the second light amount control structure 334F, the greater portions of the light beams B are projected on the first light amount control structure 333F. Since only the smaller portions of the light beams B are reflected, the reflected fraction of the light beams B is reduced. After the light beams B are projected on the first light amount control structure 333F, the greater portions of the light beams B are absorbed by the first light amount control structure 333F. Since the amount of the light beams reflected by the circuit board main body 331F is further reduced, the problem of generating bright spots will be diminished.

The structure of the luminous keyboard 3F of this embodiment may be modified. For example, in a variant example, the plural light-emitting elements and the illumination circuit board of the luminous keyboard are inverted. In another variant example, the plural light-emitting elements and the illumination circuit board of the luminous keyboard are inverted, and the luminous keyboard further comprises a second reflecting plate over the light guide plate. Under this circumstance, there are two ways of arranging the illumination circuit board. In a first arranging way, the illumination circuit board is disposed over the second reflecting plate, and the plural light-emitting elements are inserted into an upper portion of the light guide plate (i.e., similar to the arrangement of FIG. 5). In a second arranging way, the plural light-emitting elements and the illumination circuit board are inverted and accommodated within the second opening of the second reflecting plate, and the plural light-emitting elements are inserted into an upper portion of the light guide plate (i.e., similar to the arrangement of FIG. 6). By changing the locations of some components, different stack structures of the luminous keyboard can be produced. These stack structures can diminish the problem of generating bright spots.

Figure 9:
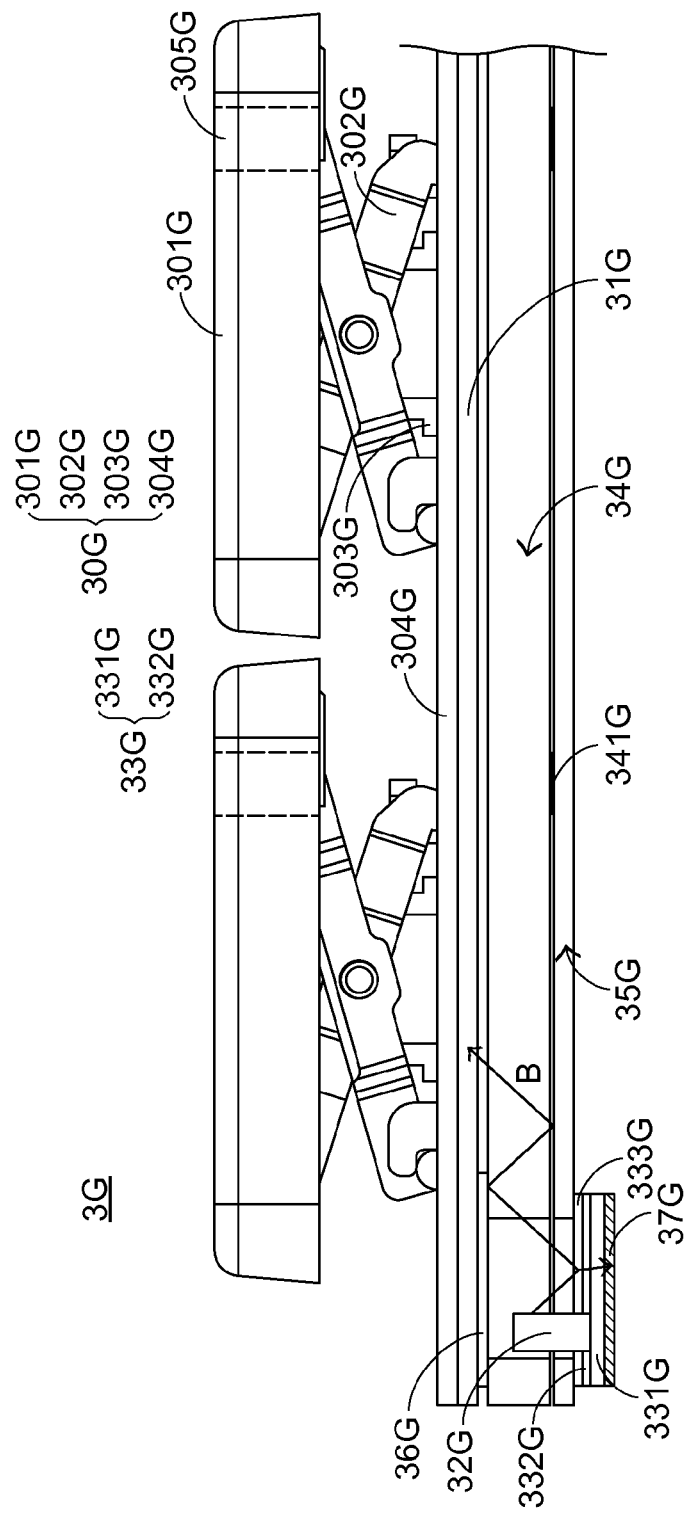
FIG. 9 is a schematic cross-sectional view illustrating the structure of a luminous keyboard according to a seventh embodiment of the present invention.

The present invention further provides a luminous keyboard of a seventh embodiment, which is distinguished from the above embodiments. FIG. 9 is a schematic cross-sectional view illustrating the structure of a luminous keyboard according to a seventh embodiment of the present invention. As shown in FIG. 9, the luminous keyboard 3G comprises a keypad module 30G, a supporting plate 31G, plural light-emitting elements 32G, an illumination circuit board 33G, a light guide plate 34G, a reflecting plate 35G, a light-shading plate 36G and a light absorption structure 37G. For clarification and brevity, only one light-emitting element 32G is shown in the drawing. The keypad module 30G comprises plural keycaps 301G, plural connecting elements 302G, plural elastic elements 303G and a switch circuit member 304G. Each keycap 301G has a light-outputting zone 305G. The light guide plate 34G comprises plural light-guiding structures 341G. Each light-guiding structure 341G is aligned with the corresponding light-outputting zone 305G. The illumination circuit board 33G comprises a circuit board main body 331G and a protective layer 332G. The protective layer 332G has a light amount control structure 333G. The components of the luminous keyboard 3G of this embodiment which are similar to the luminous keyboard 3A of the first embodiment are not redundantly described herein. In comparison with the first embodiment, the following two aspects of the luminous keyboard 3G of this embodiment are distinguished. Firstly, the light amount control structure 333G is made of an anti-reflection material, and the light amount control structure 333G is deposited on a top surface of the protective layer 332G. Secondly, the luminous keyboard 3G of this embodiment further comprises the light absorption structure 37G.

The light amount control structure 333G is not used for absorbing the light beams B. When the light beams B are projected on the light amount control structure 333G, greater portions of the light beams B are transmitted through the light amount control structure 333G, and only smaller portions of the light beams are reflected. Consequently, the reflected fraction of the light beams B is reduced. In this embodiment, the light absorption structure 37G is disposed on a bottom surface of the circuit board main body 331G. Moreover, the light absorption structure 37G and the light amount control structure 333G are disposed on opposite surfaces of the illumination circuit board 33G. Consequently, the greater portions of the light beams B introduced into the light amount control structure 333G will be transmitted through the circuit board main body 331G and absorbed by the light absorption structure 37G. Consequently, the amount of the light beams reflected by the circuit board main body 331G is further reduced.

The structure of the luminous keyboard 3G of this embodiment may be modified. For example, in a variant example, the plural light-emitting elements and the illumination circuit board of the luminous keyboard are inverted. In another variant example, the plural light-emitting elements and the illumination circuit board of the luminous keyboard are inverted, and the luminous keyboard further comprises a second reflecting plate over the light guide plate. Under this circumstance, there are two ways of arranging the illumination circuit board. In a first arranging way, the illumination circuit board is disposed over the second reflecting plate, and the plural light-emitting elements are inserted into an upper portion of the light guide plate (i.e., similar to the arrangement of FIG. 5). In a second arranging way, the plural light-emitting elements and the illumination circuit board are inverted and accommodated within the second opening of the second reflecting plate, and the plural light-emitting elements are inserted into an upper portion of the light guide plate (i.e., similar to the arrangement of FIG. 6). By changing the locations of some components, different stack structures of the luminous keyboard can be produced. These stack structures can diminish the problem of generating bright spots.

Figure 10:
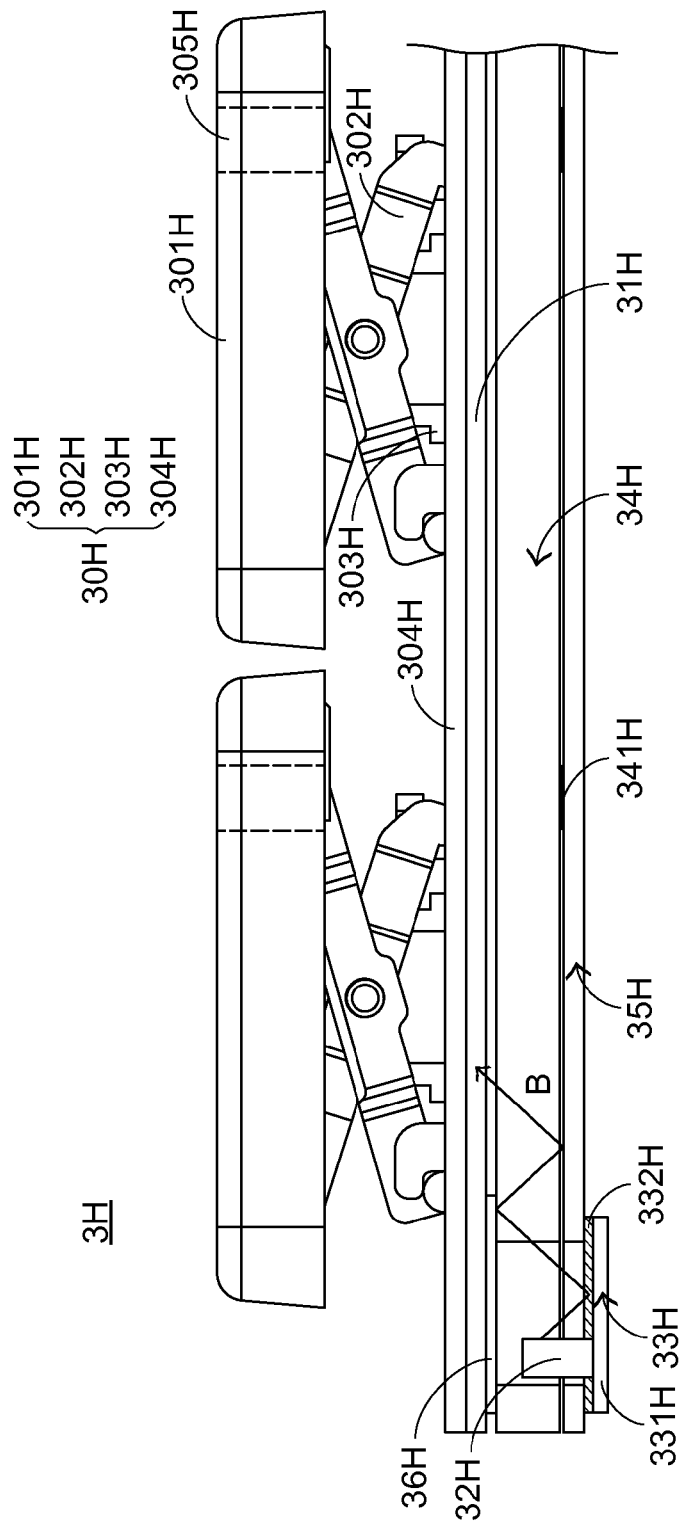
FIG. 10 is a schematic cross-sectional view illustrating the structure of a luminous keyboard according to an eighth embodiment of the present invention.

The present invention further provides a luminous keyboard of an eighth embodiment, which is distinguished from the above embodiments. FIG. 10 is a schematic cross-sectional view illustrating the structure of a luminous keyboard according to an eighth embodiment of the present invention. As shown in FIG. 10, the luminous keyboard 3H comprises a keypad module 30H, a supporting plate 31H, plural light-emitting elements 32H, an illumination circuit board 33H, a light guide plate 34H, a reflecting plate 35H, a light-shading plate 36H and a light absorption structure 37H. For clarification and brevity, only one light-emitting element 32H is shown in the drawing. The keypad module 30H comprises plural keycaps 301H, plural connecting elements 302H, plural elastic elements 303H and a switch circuit member 304H. Each keycap 301H has a light-outputting zone 305H. The light guide plate 34H comprises plural light-guiding structures 341H. Each light-guiding structure 341H is aligned with the corresponding light-outputting zone 305H. The components of the luminous keyboard 3H of this embodiment which are similar to the luminous keyboard 3A of the first embodiment are not redundantly described herein. In comparison with the first embodiment, the structure of the illumination circuit board 33H of the luminous keyboard 3H of this embodiment is distinguished. The illumination circuit board 33H comprises a circuit board main body 331H. The circuit board main body 331H has a light amount control structure 332H. The light amount control structure 332H is disposed on a top surface of the circuit board main body 331H for protecting electrical contacts (not shown) of the circuit board main body 331H. In addition, the circuit board main body 331H is exposed to the region between the plural light-emitting elements 32H and the light guide plate 34H. The light amount control structure 332H is used for absorbing portions of the plural light beams B so as to reduce the reflected fraction of the light beams B. In this embodiment, the light amount control structure 332H is made of a light absorption material. The light amount control structure 332H is attached, printed, transfer-printed or deposited on the top surface of the circuit board main body 331H. In other words, the light amount control structure 332H is able to replace the protective layer, and has the functions of protecting the electrical contacts and reducing the reflected fraction of the light beams.

The illumination of the luminous keyboard 3H will be illustrated as follows. Please refer to FIG. 10 again. When the plural light-emitting elements 32H emit the plural light beams B, portions of the light beams B are laterally introduced into the light guide plate 34H and subjected to total internal reflection within the light guide plate 34H. The light beams B can be guided to the corresponding light-outputting zones 305H by the light-guiding structures 341H so as to illuminate the light-outputting zones 305H. On the other hand, other portions of the plural light beams B are introduced into the light guide plate 34H at a larger incident angle and unable to be subjected to total internal reflection within the light guide plate 34H, and thus shaded by the light-shading plate 36H and reflected to the light guide plate 34H. Moreover, before the portions of the plural light beams B from the light-emitting elements 32H and at the larger incident angle strike the light-shading plate 36H, the light beams B are projected on the illumination circuit board 33H and transferred through the light amount control structure 332H.

When the light beams B are transferred through the light amount control structure 332H, portions of the light beams B are absorbed by the light amount control structure 332H. The remaining small portions of the light beams B are transmitted through the light amount control structure 332H and reflected to the light guide plate 34H by the underlying circuit board main body 331H, and then reflected by the reflecting plate 35H and no longer shaded by the light-shading plate 36H. Consequently, the remaining small portions of the light beams B are projected to the keycaps 301H and not directly projected to the light-outputting zones 305H.

Since portions of the light beams B at the larger incident angle are absorbed by the light amount control structure 332H between the plural light-emitting elements 32H and the light guide plate 34H, only the remaining small portions of the light beams B are reflected to the keycaps 301H. Since the light beams are not very centralized, the problem of generating bright spots will be diminished. Under this circumstance, the luminous uniformity is enhanced. In the luminous keyboard 3H of this embodiment, the protective layer is replaced by the light amount control structure 332H. Since the protective layer is omitted, the thickness of the illumination circuit board 33H is reduced. Moreover, since the luminous keyboard 3H is not equipped with the protective layer, the fabricating cost is reduced.

Figure 11:
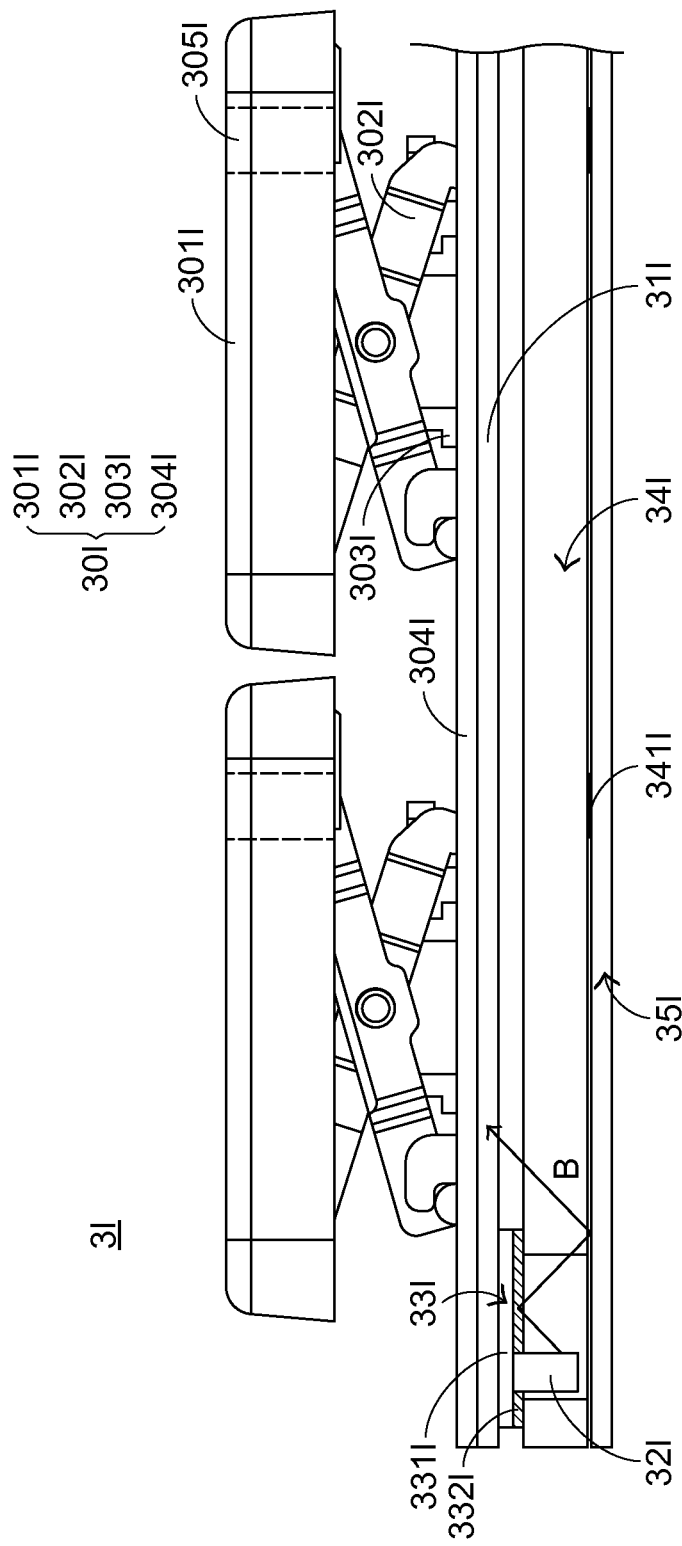
FIG. 11 is a schematic cross-sectional view illustrating the structure of a luminous keyboard according to a ninth embodiment of the present invention.

The present invention further provides a luminous keyboard of a ninth embodiment, which is distinguished from the above embodiments. FIG. 11 is a schematic cross-sectional view illustrating the structure of a luminous keyboard according to a ninth embodiment of the present invention. As shown in FIG. 11, the luminous keyboard 3I comprises a keypad module 30I, a supporting plate 31I, plural light-emitting elements 32I, an illumination circuit board 33I, a light guide plate 34I and a reflecting plate 35I. For clarification and brevity, only one light-emitting element 32I is shown in the drawing. The keypad module 30I comprises plural keycaps 301I, plural connecting elements 302I, plural elastic elements 303I and a switch circuit member 304I. Each keycap 301I has a light-outputting zone 305I. The light guide plate 34I comprises plural light-guiding structures 341I. Each light-guiding structure 341I is aligned with the corresponding light-outputting zone 305I. The illumination circuit board 33I comprises a circuit board main body 331I. The circuit board main body 331I has a light amount control structure 332I. The components of the luminous keyboard 3I of this embodiment which are similar to the luminous keyboard 3H of the eighth embodiment are not redundantly described herein. In comparison with the eighth embodiment, the luminous keyboard 3I of this embodiment is not equipped with the light-shading plate and the arrangements of the light-emitting elements 32I and the illumination circuit board 33I are distinguished.

In the embodiment of FIG. 11, the light-emitting elements 32I are inverted, and inserted into the light guide plate 34I through an upper portion of the light guide plate 34I. In addition, the illumination circuit board 33I supporting the light-emitting elements 32I is also inverted and arranged between the supporting plate 31I and the light guide plate 34I. Since the illumination circuit board 33I is disposed over the light guide plate 34I, the illumination circuit board 33I also has the function of shading the light beams B. Consequently, the luminous keyboard 3I of this embodiment is not equipped with the light-shading plate. That is, the overall thickness of the luminous keyboard 3I is reduced, and the fabricating cost of the luminous keyboard 3I is reduced to meet the economic benefit. The illuminating principle of the luminous keyboard 3I and the principle of reducing the reflected fraction of the light beams B are similar to those of the luminous keyboard 3B, and are not redundantly described herein.

Figure 12:
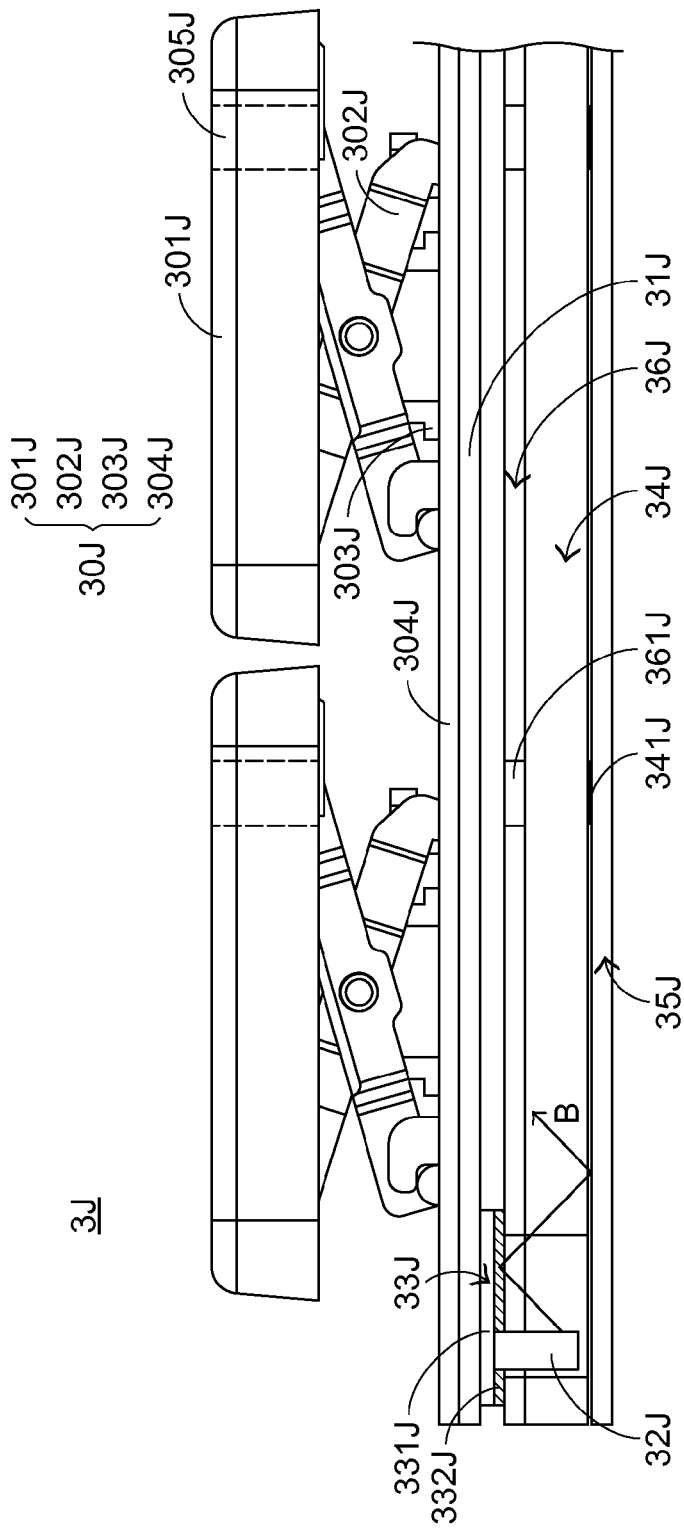
FIG. 12 is a schematic cross-sectional view illustrating the structure of a luminous keyboard according to a tenth embodiment of the present invention.

The present invention further provides a luminous keyboard of a tenth embodiment, which is distinguished from the above embodiments. FIG. 12 is a schematic cross-sectional view illustrating the structure of a luminous keyboard according to a tenth embodiment of the present invention. As shown in FIG. 12, the luminous keyboard 3J comprises a keypad module 30J, a supporting plate 31J, plural light-emitting elements 32J, an illumination circuit board 33J, a light guide plate 34J, a first reflecting plate 35J and a second reflecting plate 36J. For clarification and brevity, only one light-emitting element 32J is shown in the drawing. The keypad module 30J comprises plural keycaps 301J, plural connecting elements 302J, plural elastic elements 303J and a switch circuit member 304J. Each keycap 301J has a light-outputting zone 305J. The light guide plate 34J comprises plural light-guiding structures 341J. Each light-guiding structure 341J is aligned with the corresponding light-outputting zone 305J. The illumination circuit board 33J comprises a circuit board main body 331J. The circuit board main body 331J has a light amount control structure 332J. The components of the luminous keyboard 3J of this embodiment which are similar to the luminous keyboard 3H of the eighth embodiment are not redundantly described herein. In comparison with the eighth embodiment, the luminous keyboard 3J of this embodiment is not equipped with the light-shading plate, and the second luminous keyboard 3J further comprises the second reflecting plate 36J in replace of the light-shading plate. In addition, the illumination circuit board 33J and the light-emitting elements 32J are inverted.

The second reflecting plate 36J is disposed over the light guide plate 34J. That is, the second reflecting plate 36J and the first reflecting plate 35J are respectively disposed over and under the light guide plate 34J. The portions of the plural light beams B that are not subjected to total internal reflection within the light guide plate 34J are reflected by the first reflecting plate 35J and the second reflecting plate 36J. The second reflecting plate 36J further comprises plural openings 361J. Each opening 361J is aligned with the corresponding light-outputting zone 305J. Since the second reflecting plate 36J has the functions of shading and reflecting the light beams B, the luminous keyboard 3J of this embodiment is not equipped with the light-shading plate. The illuminating principle of the luminous keyboard 3I and the principle of reducing the reflected fraction of the light beams B are similar to those of the luminous keyboard 3C, and are not redundantly described herein.

Figure 13:
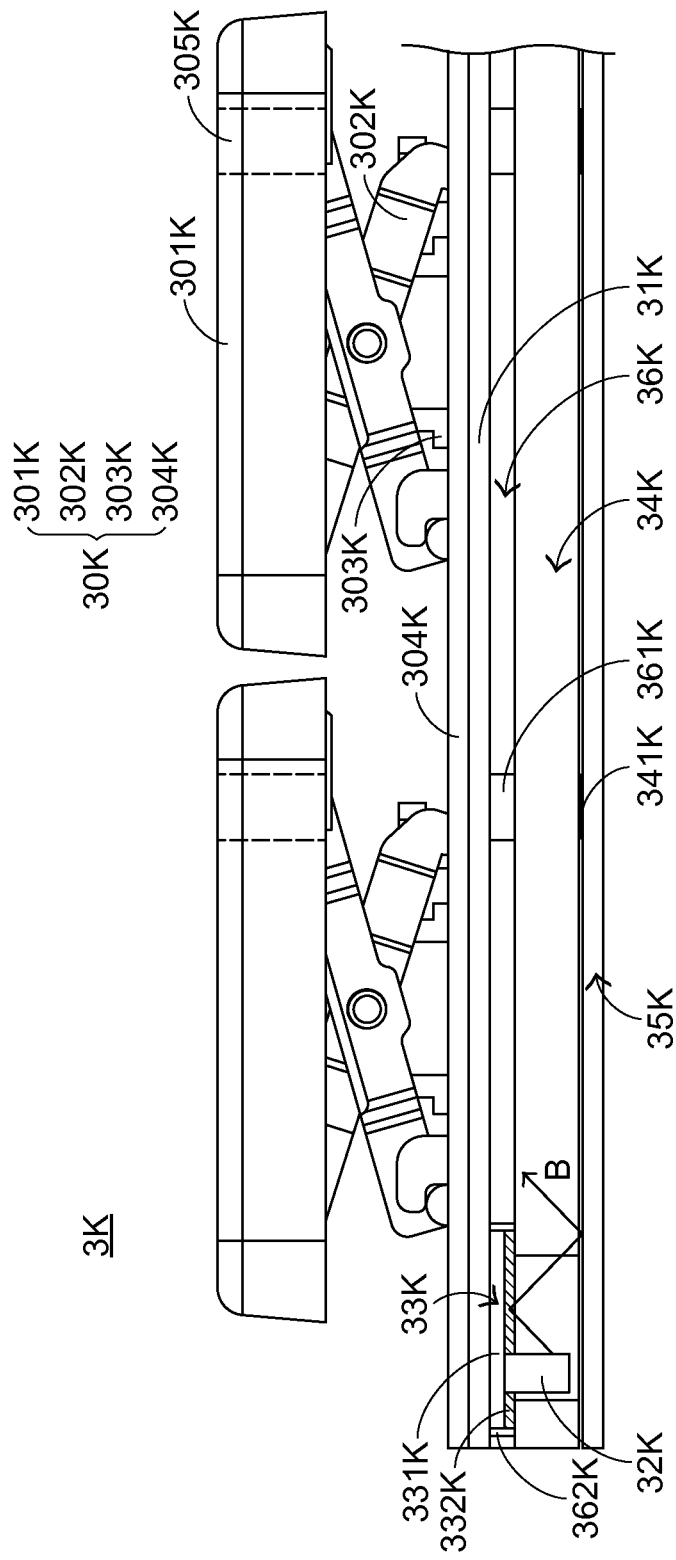
FIG. 13 is a schematic cross-sectional view illustrating the structure of a luminous keyboard according to an eleventh embodiment of the present invention.

The present invention further provides a luminous keyboard of an eleventh embodiment, which is distinguished from the above embodiments. FIG. 13 is a schematic cross-sectional view illustrating the structure of a luminous keyboard according to an eleventh embodiment of the present invention. As shown in FIG. 13, the luminous keyboard 3K comprises a keypad module 30K, a supporting plate 31K, plural light-emitting elements 32K, an illumination circuit board 33K, a light guide plate 34K, a first reflecting plate 35K and a second reflecting plate 36K. For clarification and brevity, only one light-emitting element 32K is shown in the drawing. The keypad module 30K comprises plural keycaps 301K, plural connecting elements 302K, plural elastic elements 303K and a switch circuit member 304K. Each keycap 301K has a light-outputting zone 305K. The light guide plate 34K comprises plural light-guiding structures 341K. Each light-guiding structure 341K is aligned with the corresponding light-outputting zone 305K. The second reflecting plate 36K further comprises plural first openings 361K. Each first opening 361K is aligned with the corresponding light-outputting zone 305K. The illumination circuit board 33K comprises a circuit board main body 331K. The circuit board main body 331K has a light amount control structure 332K. The components of the luminous keyboard 3K of this embodiment which are similar to the luminous keyboard 3J of the tenth embodiment are not redundantly described herein. In comparison with the tenth embodiment, the second reflecting plate 36K of the luminous keyboard 3K of this embodiment further comprises a second opening 362K. Similarly, the light beams B are allowed to pass through the plural first openings 361K of the second reflecting plate 36K. The second opening 362K is aligned with the illumination circuit board 33K and used for accommodating the illumination circuit board 33K. Consequently, the inverted light-emitting elements 32K are inserted into the light guide plate 34K through an upper portion of the light guide plate 34K.

Although the structures of the luminous keyboard 3K of this embodiment are somewhat different from the structures of the luminous keyboard 3J of the tenth embodiment, the position of the light amount control structure 332K is similar to that of the tenth embodiment. Consequently, the luminous uniformity of the luminous keyboard 3K is also enhanced. The illumination of the luminous keyboard 3K is similar to the illumination of the luminous keyboard 3K of the third embodiment, and is not redundantly described herein.

Figure 14:
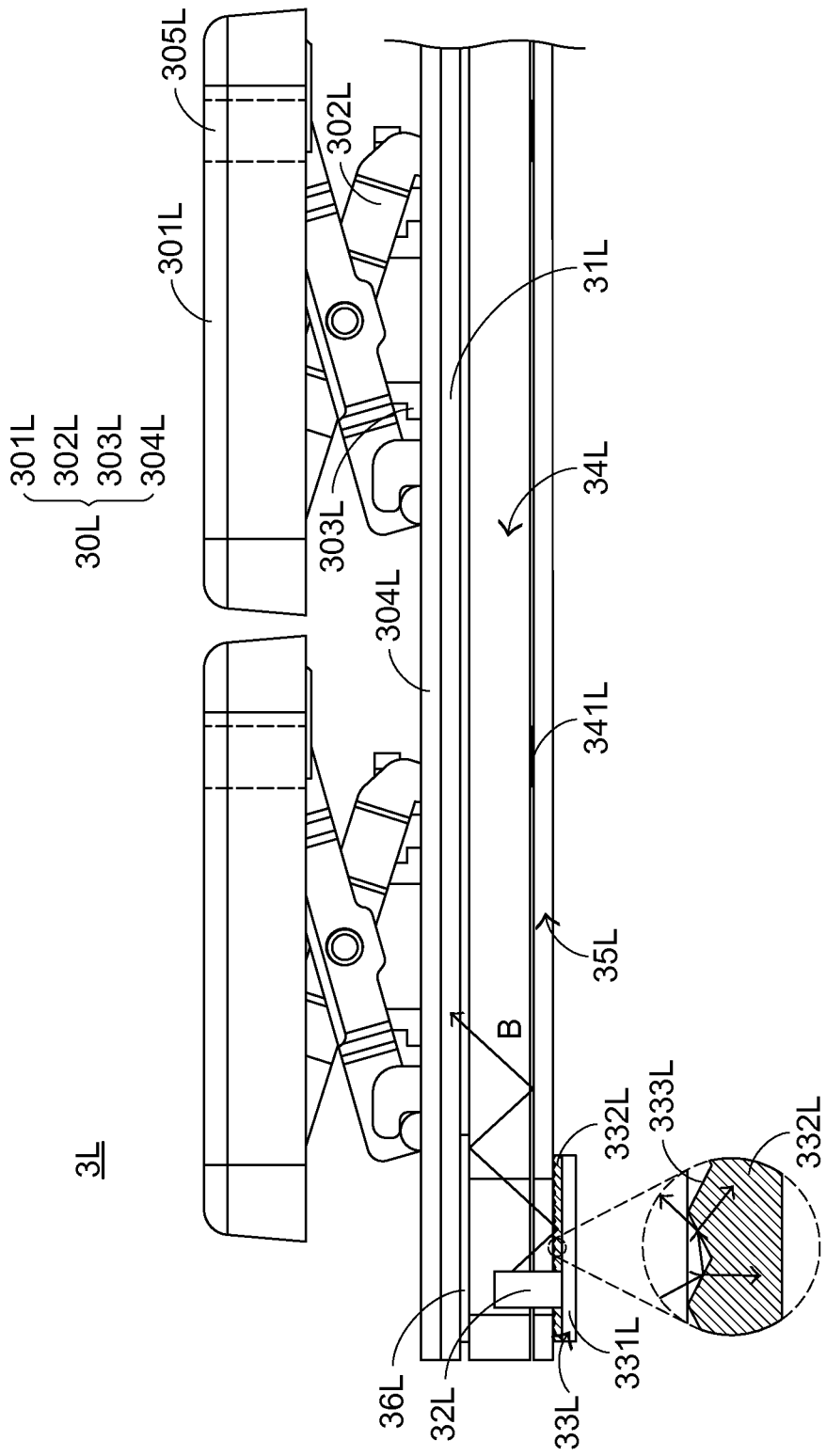
FIG. 14 is a schematic cross-sectional view illustrating the structure of a luminous keyboard according to a twelfth embodiment of the present invention.

The present invention further provides a luminous keyboard of a twelfth embodiment, which is distinguished from the above embodiments. FIG. 14 is a schematic cross-sectional view illustrating the structure of a luminous keyboard according to a twelfth embodiment of the present invention. As shown in FIG. 14, the luminous keyboard 3L comprises a keypad module 30L, a supporting plate 31L, plural light-emitting elements 32L, an illumination circuit board 33L, a light guide plate 34L, a reflecting plate 35L and a light-shading plate 36L. For clarification and brevity, only one light-emitting element 32L is shown in the drawing. The keypad module 30L comprises plural keycaps 301L, plural connecting elements 302L, plural elastic elements 303L and a switch circuit member 304L. Each keycap 301L has a light-outputting zone 305L. The light guide plate 34L comprises plural light-guiding structures 341L. Each light-guiding structure 341L is aligned with the corresponding light-outputting zone 305L. The illumination circuit board 33L comprises a circuit board main body 331L. The circuit board main body 331L has a first light amount control structure 332L. The components of the luminous keyboard 3L of this embodiment which are similar to the luminous keyboard 3H of the eighth embodiment are not redundantly described herein. In comparison with the eighth embodiment, the circuit board main body 331L of the luminous keyboard 3L of this embodiment further comprises a second light amount control structure 333L.

As shown in FIG. 14, the second light amount control structure 333L is disposed on a top surface of the first light amount control structure 332L. Since the plural light beams B are reflected for many times by the second light amount control structure 333L, the reflected fraction of the plural light beams B is reduced. In this embodiment, the second light amount control structure 333L is a texturing structure that is integrally formed with the first light amount control structure 332L. That is, because of the second light amount control structure 333L, the top surface of the first light amount control structure 332L is an uneven surface. Consequently, the plural light beams B are reflected for many times by the uneven surface. When the light beams B are projected on the uneven surface at a first time, portions of the light beams B are reflected by the second light amount control structure 333L (i.e., the texturing structure) and thus projected on the uneven surface at a second time. The remaining portion of the light beams that are not reflected are absorbed by the first light amount control structure 332L. The operations of the reflected light beams projected on the uneven surface at the second time are similar to the operations of the light beams projected on the uneven surface at the first time. Consequently, less amount of the light beams B is reflected by the light amount control structure 333L. In other words, after the light beams B are projected on the second light amount control structure 333L for many times, the number of times that the light beams B are reflected is increased and the reflected fraction of the light beams B is reduced. Since the light beams are not very centralized, the problem of generating bright spots will be diminished. Under this circumstance, the luminous uniformity is enhanced.

The structure of the luminous keyboard 3L of this embodiment may be modified. For example, in a variant example, the plural light-emitting elements and the illumination circuit board of the luminous keyboard are inverted. In another variant example, the plural light-emitting elements and the illumination circuit board of the luminous keyboard are inverted, and the luminous keyboard further comprises a second reflecting plate over the light guide plate. Under this circumstance, there are two ways of arranging the illumination circuit board. In a first arranging way, the illumination circuit board is disposed over the second reflecting plate, and the plural light-emitting elements are inserted into an upper portion of the light guide plate (i.e., similar to the arrangement of FIG. 12). In a second arranging way, the plural light-emitting elements and the illumination circuit board are inverted and accommodated within the second opening of the second reflecting plate, and the plural light-emitting elements are inserted into an upper portion of the light guide plate (i.e., similar to the arrangement of FIG. 13). By changing the locations of some components, different stack structures of the luminous keyboard can be produced. These stack structures can diminish the problem of generating bright spots.

Figure 15:
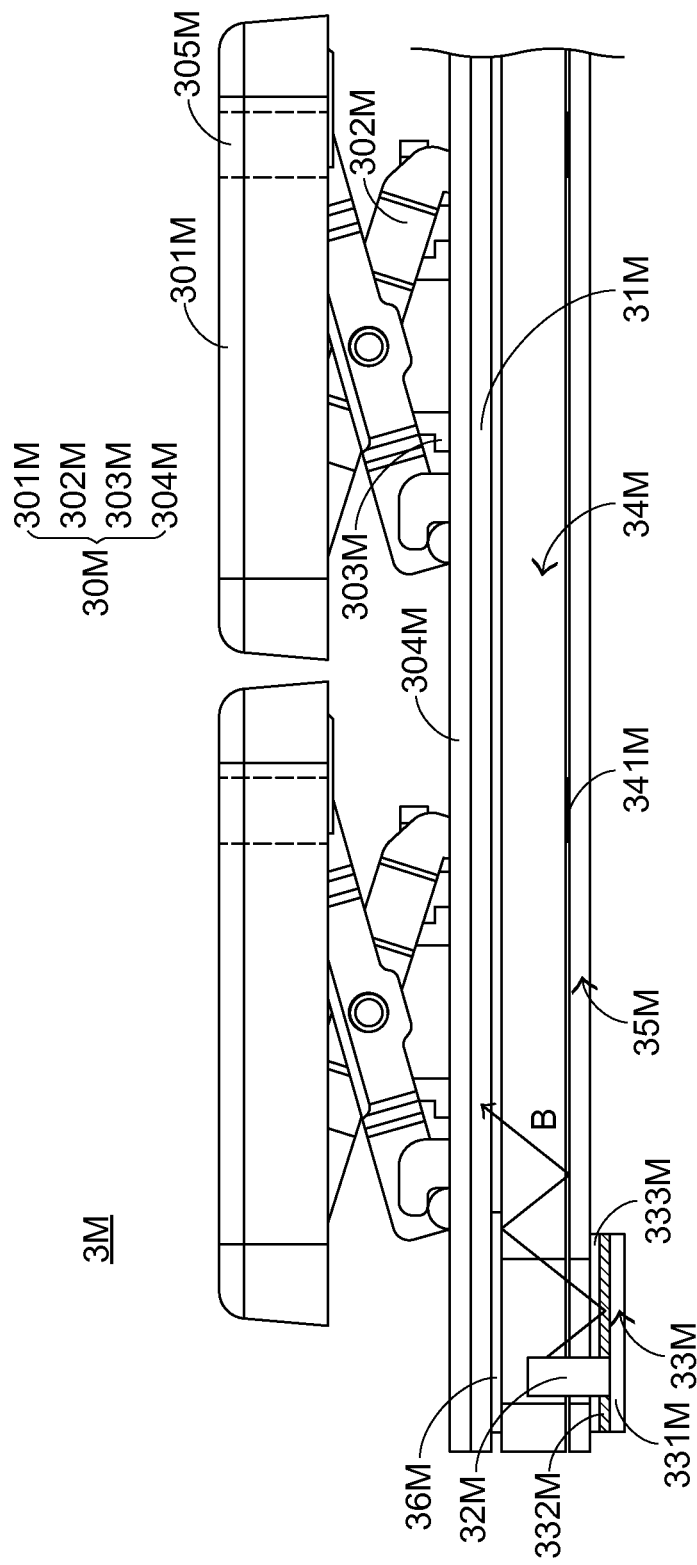
FIG. 15 is a schematic cross-sectional view illustrating the structure of a luminous keyboard according to a thirteenth embodiment of the present invention.

The present invention further provides a luminous keyboard of a thirteenth embodiment, which is distinguished from the above embodiments. FIG. 15 is a schematic cross-sectional view illustrating the structure of a luminous keyboard according to a thirteenth embodiment of the present invention. As shown in FIG. 15, the luminous keyboard 3M comprises a keypad module 30M, a supporting plate 31M, plural light-emitting elements 32M, an illumination circuit board 33M, a light guide plate 34M, a reflecting plate 35M and a light-shading plate 36M. For clarification and brevity, only one light-emitting element 32M is shown in the drawing. The keypad module 30M comprises plural keycaps 301M, plural connecting elements 302M, plural elastic elements 303M and a switch circuit member 304M. Each keycap 301M has a light-outputting zone 305M. The light guide plate 34M comprises plural light-guiding structures 341M. Each light-guiding structure 341M is aligned with the corresponding light-outputting zone 305M. The illumination circuit board 33M comprises a circuit board main body 331M. The circuit board main body 331M has a first light amount control structure 332M. The components of the luminous keyboard 3M of this embodiment which are similar to the luminous keyboard 3H of the eighth embodiment are not redundantly described herein. In comparison with the eighth embodiment, the following two aspects of the luminous keyboard 3M of this embodiment are distinguished. Firstly, the first light amount control structure 333M is made of an anti-reflection material. Secondly, the circuit board main body 331M of the luminous keyboard 3M of this embodiment further comprises a second light amount control structure 333M.

As shown in FIG. 15, the first light amount control structure 332M is deposited on a top surface of the circuit board main body 331M, and the second light amount control structure 333M is disposed on a top surface of the first light amount control structure 332M. The second light amount control structure 333M is not used for absorbing the light beams B. By the second light amount control structure 333M, the amount of the light beams B to be projected on the first light amount control structure 332M is reduced, and thus the reflected fraction of the light beams B is reduced. In this embodiment, the second light amount control structure 333M is made of an anti-reflection material. Consequently, when the light beams B are transferred through the second light amount control structure 333M, the greater portions of the light beams B are projected on the first light amount control structure 332M. Since only the smaller portions of the light beams B are reflected, the reflected fraction of the light beams B is reduced. After the light beams B are projected on the first light amount control structure 332M, the greater portions of the light beams B are absorbed by the first light amount control structure 332M. Since the amount of the light beams reflected by the circuit board main body 331M is further reduced, the problem of generating bright spots will be diminished.

The structure of the luminous keyboard 3M of this embodiment may be modified. For example, in a variant example, the plural light-emitting elements and the illumination circuit board of the luminous keyboard are inverted. In another variant example, the plural light-emitting elements and the illumination circuit board of the luminous keyboard are inverted, and the luminous keyboard further comprises a second reflecting plate over the light guide plate. Under this circumstance, there are two ways of arranging the illumination circuit board. In a first arranging way, the illumination circuit board is disposed over the second reflecting plate, and the plural light-emitting elements are inserted into an upper portion of the light guide plate (i.e., similar to the arrangement of FIG. 12). In a second arranging way, the plural light-emitting elements and the illumination circuit board are inverted and accommodated within the second opening of the second reflecting plate, and the plural light-emitting elements are inserted into an upper portion of the light guide plate (i.e., similar to the arrangement of FIG. 13). By changing the locations of some components, different stack structures of the luminous keyboard can be produced. These stack structures can diminish the problem of generating bright spots.

Figure 16:
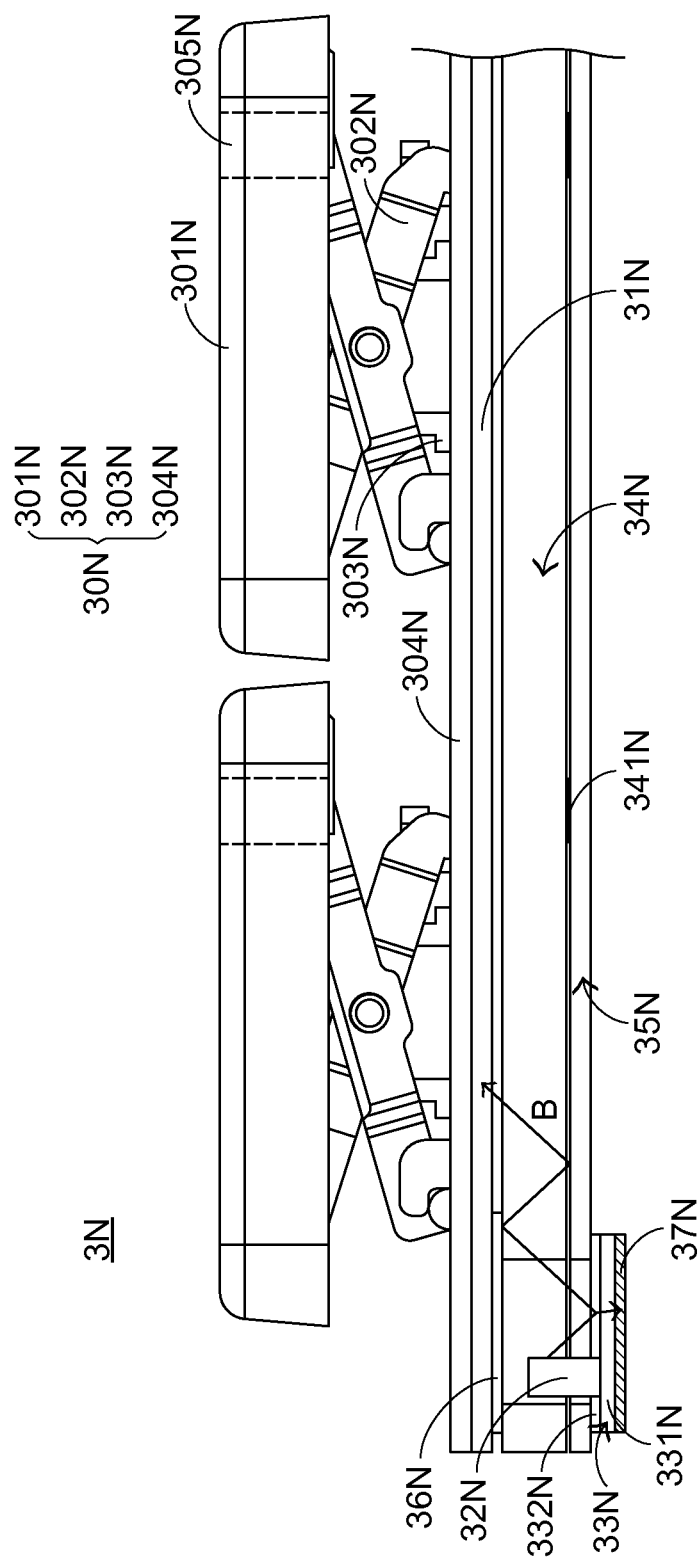
FIG. 16 is a schematic cross-sectional view illustrating the structure of a luminous keyboard according to a fourteenth embodiment of the present invention.

The present invention further provides a luminous keyboard of a fourteenth embodiment, which is distinguished from the above embodiments. FIG. 16 is a schematic cross-sectional view illustrating the structure of a luminous keyboard according to a fourteenth embodiment of the present invention. As shown in FIG. 16, the luminous keyboard 3N comprises a keypad module 30N, a supporting plate 31N, plural light-emitting elements 32N, an illumination circuit board 33N, a light guide plate 34N, a reflecting plate 35N, a light-shading plate 36N and a light absorption structure 37N. For clarification and brevity, only one light-emitting element 32N is shown in the drawing. The keypad module 30N comprises plural keycaps 301N, plural connecting elements 302N, plural elastic elements 303N and a switch circuit member 304N. Each keycap 301N has a light-outputting zone 305N. The light guide plate 34N comprises plural light-guiding structures 341N. Each light-guiding structure 341N is aligned with the corresponding light-outputting zone 305N. The illumination circuit board 33N comprises a circuit board main body 331N. The circuit board main body 331N has a light amount control structure 332N. The components of the luminous keyboard 3N of this embodiment which are similar to the luminous keyboard 3H of the eighth embodiment are not redundantly described herein. In comparison with the eighth embodiment, the following two aspects of the luminous keyboard 3N of this embodiment are distinguished. Firstly, the light amount control structure 332N is made of an anti-reflection material, and the light amount control structure 332N is deposited on a top surface of the circuit board main body 331N. Secondly, the luminous keyboard 3N of this embodiment further comprises the light absorption structure 37N.

The light amount control structure 332N is not used for absorbing the light beams B. When the light beams B are projected on the light amount control structure 332N, greater portions of the light beams B are transmitted through the light amount control structure 332N, and only smaller portions of the light beams are reflected. Consequently, the reflected fraction of the light beams B is reduced. In this embodiment, the light absorption structure 37N is disposed on a bottom surface of the circuit board main body 331N. Moreover, the light absorption structure 37N and the light amount control structure 332N are disposed on opposite surfaces of the illumination circuit board 33N. Consequently, the greater portions of the light beams B introduced into the light amount control structure 332N will be transferred through the circuit board main body 331N and absorbed by the light absorption structure 37N. Consequently, the amount of the light beams reflected by the circuit board main body 331N is further reduced.

The structure of the luminous keyboard 3N of this embodiment may be modified. For example, in a variant example, the plural light-emitting elements and the illumination circuit board of the luminous keyboard are inverted. In another variant example, the plural light-emitting elements and the illumination circuit board of the luminous keyboard are inverted, and the luminous keyboard further comprises a second reflecting plate over the light guide plate. Under this circumstance, there are two ways of arranging the illumination circuit board. In a first arranging way, the illumination circuit board is disposed over the second reflecting plate, and the plural light-emitting elements are inserted into an upper portion of the light guide plate (i.e., similar to the arrangement of FIG. 12). In a second arranging way, the plural light-emitting elements and the illumination circuit board are inverted and accommodated within the second opening of the second reflecting plate, and the plural light-emitting elements are inserted into an upper portion of the light guide plate (i.e., similar to the arrangement of FIG. 13). By changing the locations of some components, different stack structures of the luminous keyboard can be produced. These stack structures can diminish the problem of generating bright spots.

Figure 17:
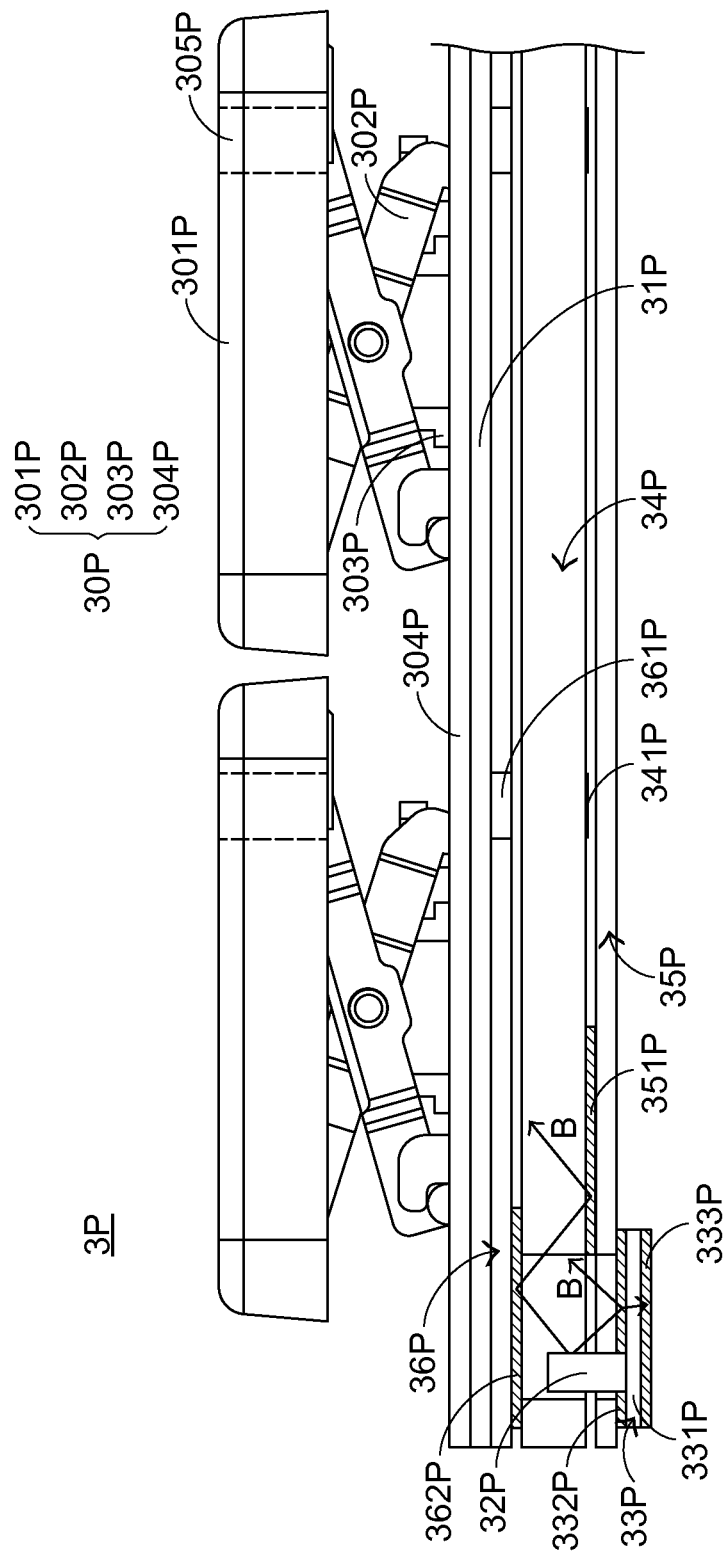
FIG. 17 is a schematic cross-sectional view illustrating the structure of a luminous keyboard according to a fifteenth embodiment of the present invention.

The present invention further provides a luminous keyboard of a fifteenth embodiment, which is distinguished from the above embodiments. FIG. 17 is a schematic cross-sectional view illustrating the structure of a luminous keyboard according to a fifteenth embodiment of the present invention. As shown in FIG. 17, the luminous keyboard 3P comprises a keypad module 30P, a supporting plate 31P, plural light-emitting elements 32P, an illumination circuit board 33P, a light guide plate 34P, a first reflecting plate 35P and a second reflecting plate 36P. For clarification and brevity, only one light-emitting element 32P is shown in the drawing. The keypad module 30P comprises plural keycaps 301P, plural connecting elements 302P, plural elastic elements 303P and a switch circuit member 304P. Each keycap 301P has a light-outputting zone 305P. The light guide plate 34P comprises plural light-guiding structures 341P. Each light-guiding structure 341P is aligned with the corresponding light-outputting zone 305P. The second reflecting plate 36P further comprises plural openings 361P. Each opening 361P is aligned with the corresponding light-outputting zone 305P. The illumination circuit board 33P comprises a circuit board main body 331P. The circuit board main body 331P has a first light amount control structure 332P. The components of the luminous keyboard 3P of this embodiment which are similar to the luminous keyboard 3J of the tenth embodiment are not redundantly described herein. In comparison with the tenth embodiment, the following three aspects of the luminous keyboard 3P of this embodiment are distinguished. Firstly, the circuit board main body 331P of the luminous keyboard 3P of this embodiment further comprises a second light amount control structure 333P. Secondly, the first reflecting plate 35P of the luminous keyboard 3P of this embodiment further comprises plural third light amount control structures 351P corresponding to the plural light-emitting elements 32P. Thirdly, the second reflecting plate 36P of the luminous keyboard 3P of this embodiment further comprises plural fourth light amount control structures 362P corresponding to the plural light-emitting elements 32P.

As shown in FIG. 17, the plural third light amount control structures 351P (only one is shown in the drawing) are disposed on a top surface of the first reflecting plate 35P, and arranged between the light guide plate 34P and the first reflecting plate 35P. The plural fourth light amount control structures 362P (only one is shown in the drawing) are disposed on a bottom surface of the second reflecting plate 36P, and arranged between the light guide plate 34P and the second reflecting plate 36P. In this embodiment, the first light amount control structure 332P, the second light amount control structure 333P, the plural third light amount control structures 351P and the plural fourth light amount control structures 362P are made of light absorption materials. Preferably but not exclusively, these light amount control structures are formed by an attaching process, a printing process, a transfer printing process or a depositing process. In another embodiment, the first light amount control structure, the second light amount control structure, the plural third light amount control structures and the plural fourth light amount control structures are made of other materials (e.g., anti-reflection materials). Alternatively, the surfaces of the first light amount control structure, the second light amount control structure, the plural third light amount control structures and the plural fourth light amount control structures are texturing structures made of light absorption materials.

The illumination of the luminous keyboard 3P will be illustrated as follows. Please refer to FIG. 17 again. When the plural light-emitting elements 32P emit the plural light beams B, portions of the light beams B are laterally introduced into the light guide plate 34P and subjected to total internal reflection within the light guide plate 34P. The light beams B can be guided to the corresponding light-outputting zones 305P by the plural light-guiding structures 341P so as to illuminate the light-outputting zones 305P. On the other hand, other portions of the plural light beams B are introduced into the light guide plate 34P at a larger incident angle and unable to be subjected to total internal reflection within the light guide plate 34P, and thus shaded by at least one of the first reflecting plate 35P and the second reflecting plate 36P and reflected to the light guide plate 34P. Moreover, before the portions of the plural light beams B from the light-emitting elements 32P and at the larger incident angle strike the at least one of the first reflecting plate 35P and the second reflecting plate 36P, the light beams B are projected on the illumination circuit board 33P and transferred through the first light amount control structure 332P.

When the light beams B are transferred through the first light amount control structure 332P, portions of the light beams B are absorbed by the first light amount control structure 332P. The remaining small portions of the light beams B are transmitted through the first light amount control structure 332P and reflected to the light guide plate 34P by the underlying circuit board main body 331P, and then reflected by the at least one of the first reflecting plate 35P and the second reflecting plate 36P. In particular, the remaining small portions of the light beams B are alternately reflected by the first reflecting plate 35P and the second reflecting plate 36P, and projected to the keycaps 301P and not directly projected to the light-outputting zones 305P. Since the light beams are not very centralized, the problem of generating bright spots will be diminished at a first time. In case that the remaining small portions of the light beams B are not completely reflected by the circuit board main body 331P, the tiny portions of the light beams B transmitted through the circuit board main body 331P are absorbed by the second light amount control structure 333P on the bottom surface of the circuit board main body 331P. Consequently, the tiny portions of the light beams B transmitted through the circuit board main body 331P will not be leaked out.

When the light beams B are transferred through the third light amount control structure 351P, portions of the light beams B are absorbed by the third light amount control structure 351P. The remaining small portions of the light beams B are transmitted through the third light amount control structure 351P and reflected by the underlying first reflecting plate 35P. The remaining small portions of the light beams B are alternately reflected by the first reflecting plate 35P and the second reflecting plate 36P, and projected to the keycaps 301P. Since the light beams are not very centralized, the problem of generating bright spots will be diminished at a second time. When the light beams B are transferred through the fourth light amount control structure 362P, portions of the light beams B are absorbed by the fourth light amount control structure 362P. The remaining small portions of the light beams B are transmitted through the fourth light amount control structure 362P and reflected by the overlying second reflecting plate 36P. The remaining small portions of the light beams B are alternately reflected by the first reflecting plate 35P and the second reflecting plate 36P, and projected to the keycaps 301P. Since the light beams are not very centralized, the problem of generating bright spots will be diminished at a third time. Consequently, the luminous uniformity of the luminous keyboard 3P is enhanced.

The structure of the luminous keyboard 3P of this embodiment may be modified. For example, in a variant example, the plural light-emitting elements and the illumination circuit board of the luminous keyboard are inverted. In another variant example, the plural light-emitting elements and the illumination circuit board of the luminous keyboard are inverted, and the luminous keyboard further comprises a second reflecting plate over the light guide plate. Under this circumstance, there are two ways of arranging the illumination circuit board. In a first arranging way, the illumination circuit board is disposed over the second reflecting plate, and the plural light-emitting elements are inserted into an upper portion of the light guide plate (i.e., similar to the arrangement of FIG. 12). In a second arranging way, the plural light-emitting elements and the illumination circuit board are inverted and accommodated within the second opening of the second reflecting plate, and the plural light-emitting elements are inserted into an upper portion of the light guide plate (i.e., similar to the arrangement of FIG. 13). By changing the locations of some components, different stack structures of the luminous keyboard can be produced. These stack structures can diminish the problem of generating bright spots. Alternatively, the illumination circuit board of the luminous keyboard has the structure similar to that of the first embodiment. That is, the illumination circuit board is equipped with the first light amount control structure and the second light amount control structure.

From the above descriptions, the present invention provides a luminous keyboard. The luminous keyboard has an illumination circuit board with a specified structure. In particular, a light amount control structure with many variant examples is disposed on the illumination circuit board, and the light amount control structure is arranged between a light guide plate and plural light-emitting elements. That is, the light amount control structure is located at the propagating path of the light beams. By means of the light amount control structure, the reflected fraction of the light beams is reduced. Since the light beams are not very centralized, the problem of generating bright spots will be diminished.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. A luminous keyboard, comprising:
   a keypad module exposed to a top surface of the luminous keyboard;
   at least one light-emitting element disposed under the keypad module, and emitting at least one light beam;
   an illumination circuit board disposed under the keypad module, and supporting the at least one light-emitting element, wherein the illumination circuit board comprises a circuit board main body and a protective layer, wherein the circuit board main body is electrically connected with the at least one light-emitting element, the at least one light-emitting element is supported on the circuit board main body, and the protective layer is disposed on a top surface of the circuit board main body to protect the circuit board main body; and
   a light guide plate disposed under the keypad module, wherein the at least one light beam is subjected to total internal reflection within the light guide plate and guided to the keypad module by the light guide plate,
   wherein the protective layer has a light amount control structure, and the light amount control structure is disposed on a top surface of the protective layer, wherein when the at least one light beam is projected on the illumination circuit board, a reflected fraction of the at least one light beam is reduced by the light amount control structure, wherein the light amount control structure is arranged between the circuit board main body and the light guide plate, and exposed to a region between the at least one light-emitting element and the light guide plate, wherein the light amount control structure increases a number of times of reflecting the at least one light beam so as to reduce the reflected fraction of the at least one light beam, wherein the light amount control structure is a texturing structure that is integrally formed with the protective layer.

2. The luminous keyboard according to claim 1, wherein the at least one light-emitting element and the illumination circuit board are upright, wherein the illumination circuit board is disposed under the light guide plate, and the at least one light-emitting element is inserted into a lower portion of the light guide plate.

3. The luminous keyboard according to claim 1, wherein the at least one light-emitting element and the illumination circuit board are inverted, wherein the illumination circuit board is disposed over the light guide plate, and the at least one light-emitting element is inserted into an upper portion of the light guide plate.

4. The luminous keyboard according to claim 1, wherein the luminous keyboard further comprises a supporting plate under the keypad module, and the keypad module is supported on the supporting plate, wherein the keypad module comprises:
   plural keys exposed to the top surface of the luminous keyboard, wherein each of the plural keys comprises:
      a keycap exposed to the top surface of the luminous keyboard, wherein the keycap comprises a light-outputting zone, wherein after the at least one light beam is guided by the light guide plate, the at least one light beam is transmitted through the light-outputting zone;
      a connecting element arranged between the supporting plate and the keycap, wherein by the connecting element, the supporting plate and the keycap are connected with each other, and the keycap is movable upwardly and downwardly relative to the supporting plate; and
      an elastic element disposed under the keycap, and providing an elastic force to the keycap, wherein the keycap is returned to an original position in response to the elastic force; and
   a switch circuit member disposed under the plural keys, wherein when the switch circuit member is triggered by the plural keys, the switch circuit member generates corresponding key signals.

5. A luminous keyboard comprising:
   a keypad module exposed to a top surface of the luminous keyboard;

at least one light-emitting element disposed under the keypad module, and emitting at least one light beam;

an illumination circuit board disposed under the keypad module, and supporting the at least one light-emitting element, wherein the illumination circuit board comprises a circuit board main body and a protective layer, wherein the circuit board main body is electrically connected with the at least one light-emitting element, the at least one light-emitting element is supported on the circuit board main body, and the protective layer is disposed on a top surface of the circuit board main body to protect the circuit board main body; and a light guide plate disposed under the keypad module, wherein the at least one light beam is subjected to total internal reflection within the light guide plate and guided to the keypad module by the light guide plate, wherein the protective layer has a light amount control structure, and the light amount control structure is disposed on a top surface of the protective layer, wherein when the at least one light beam is projected on the illumination circuit board, a reflected fraction of the at least one light beam is reduced by the light amount control structure, wherein the protective layer further comprises an additional light amount control structure, and the additional light amount control structure is formed on a top surface of the light amount control structure, wherein the additional light amount control structure absorbs a portion of the at least one light beam to reduce the reflected fraction of the at least one light beam, or the additional light amount control structure allows a portion of the at least one light beam to enter the protective layer, or the additional light amount control structure increases a number of times of reflecting the at least one light beam.

6. A luminous keyboard, comprising:

a keypad module exposed to a top surface of the luminous keyboard;

at least one light-emitting element disposed under the keypad module, and emitting at least one light beam;

an illumination circuit board disposed under the keypad module, and supporting the at least one light-emitting element, wherein the illumination circuit board comprises a circuit board main body, wherein the circuit board main body is electrically connected with the at least one light-emitting element, and the at least one light-emitting element is supported on the circuit board main body; and a light guide plate disposed under the keypad module, wherein the at least one light beam is subjected to total internal reflection within the light guide plate and guided to the keypad module by the light guide plate, wherein the circuit board main body has a light amount control structure, and the light amount control structure is disposed on a top surface of the circuit board main body, wherein when the at least one light beam is projected on the illumination circuit board, a reflected fraction of the at least one light beam is reduced by the light amount control structure, wherein the light amount control structure is arranged between the circuit board main body and the light guide plate, and exposed to a region between the at least one light-emitting element and the light guide plate, wherein the light amount control structure increases a number of times of reflecting the at least one light beam so as to reduce the reflected fraction of the at least one light beam, wherein the light amount control structure is a texturing structure that is integrally formed with the circuit board main body.

7. The luminous keyboard according to claim 6, wherein the at least one light-emitting element and the illumination circuit board are upright, wherein the illumination circuit board is disposed under the light guide plate, and the at least one light-emitting element is inserted into a lower portion of the light guide plate.

8. The luminous keyboard according to claim 6, wherein the at least one light-emitting element and the illumination circuit board are inverted, wherein the illumination circuit board is disposed over the light guide plate, and the at least one light-emitting element is inserted into an upper portion of the light guide plate.

9. The luminous keyboard according to claim 6, wherein the luminous keyboard further comprises a supporting plate under the keypad module, and the keypad module is supported on the supporting plate, wherein the keypad module comprises:

plural keys exposed to the top surface of the luminous keyboard, wherein each of the plural keys comprises:
a keycap exposed to the top surface of the luminous keyboard, wherein the keycap comprises a light-outputting zone, wherein after the at least one light beam is guided by the light guide plate, the at least one light beam is transmitted through the light-outputting zone;
a connecting element arranged between the supporting plate and the keycap, wherein by the connecting element, the supporting plate and the keycap are connected with each other, and the keycap is movable upwardly and downwardly relative to the supporting plate; and
an elastic element disposed under the keycap, and providing an elastic force to the keycap, wherein the keycap is returned to an original position in response to the elastic force; and a switch circuit member disposed under the plural keys, wherein when the switch circuit member is triggered by the plural keys, the switch circuit member generates corresponding key signals.

10. A luminous keyboard comprising:

a keypad module exposed to a top surface of the luminous keyboard;

at least one light-emitting element disposed under the keypad module, and emitting at least one light beam;

an illumination circuit board disposed under the keypad module, and supporting the at least one light-emitting element, wherein the illumination circuit board comprises a circuit board main body, wherein the circuit board main body is electrically connected with the at least one light-emitting element, and the at least one light-emitting element is supported on the circuit board main body; and a light guide plate disposed under the keypad module, wherein the at least one light beam is subjected to total internal reflection within the light guide plate and guided to the keypad module by the light guide plate, wherein the circuit board main body has a light amount control structure, and the light amount control structure is disposed on a top surface of the circuit board main body, wherein when the at least one light beam is projected on the illumination circuit board, a reflected fraction of the at least one light beam is reduced by the light amount control structure, wherein the circuit board main body further comprises an additional light amount control structure, and the additional light amount control structure is formed on a top surface of the light amount control structure, wherein the additional light amount control structure absorbs a portion of the at least one light beam to reduce the reflected fraction of the at least one light beam, or the additional light amount control structure allows a portion of the at least one light beam to enter the circuit board main body, or the additional light amount control structure increases a number of times of reflecting the at least one light beam.

* * * * *